US011929221B2

(12) United States Patent
Fukuda et al.

(10) Patent No.: US 11,929,221 B2
(45) Date of Patent: Mar. 12, 2024

(54) INTERRUPTER AND INTERRUPTER SYSTEM

(71) Applicant: Panasonic Intellectual Property Management Co., Ltd., Osaka (JP)

(72) Inventors: Yoshihisa Fukuda, Osaka (JP); Kazuhisa Kinoshita, Osaka (JP); Shinya Kimoto, Osaka (JP); Kenji Kanematsu, Osaka (JP); Masato Nakamura, Hyogo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 370 days.

(21) Appl. No.: 17/281,056

(22) PCT Filed: Sep. 26, 2019

(86) PCT No.: PCT/JP2019/037750

§ 371 (c)(1),
(2) Date: Mar. 29, 2021

(87) PCT Pub. No.: WO2020/071218

PCT Pub. Date: Apr. 9, 2020

(65) Prior Publication Data

US 2021/0350991 A1 Nov. 11, 2021

(30) Foreign Application Priority Data

Oct. 1, 2018 (JP) ................................ 2018-186906

(51) Int. Cl.
*H01H 39/00* (2006.01)

(52) U.S. Cl.
CPC ................................ *H01H 39/006* (2013.01)

(58) Field of Classification Search
CPC ..... H01H 39/00–006; H01H 2039/008; H01H 85/08; H01H 85/12
See application file for complete search history.

(56) References Cited

U.S. PATENT DOCUMENTS 4,125,819 A * 11/1978 Jacobs, Jr. ............ H01H 85/18
337/161
4,417,519 A 11/1983 Lutz
(Continued)

FOREIGN PATENT DOCUMENTS

JP 2012-156103 8/2012
JP 2013-522834 6/2013
(Continued)

OTHER PUBLICATIONS

Nov. 2, 2021 European Search Report issued in corresponding European patent application No. 19868797.2.
(Continued)

*Primary Examiner* — Jacob R Crum
(74) *Attorney, Agent, or Firm* — GREENBLUM & BERNSTEIN, P.L.C.

(57) ABSTRACT

An interrupter includes a gas producer, an actuator pin, and an electrical conductor. The electrical conductor includes a first terminal portion, a first separable portion, a second terminal portion, and a second separable portion. The second separable portion is electrically connected to the first separable portion in parallel. A first timing when the first separable portion starts to be cut off from the first terminal portion is earlier than a second timing when the second separable portion starts to be cut off from the second terminal portion.

16 Claims, 26 Drawing Sheets

(56) References Cited

U.S. PATENT DOCUMENTS

| | | | | |
|---|---|---|---|---|
| 6,556,119 | B1 * | 4/2003 | Lell | H01H 37/323 337/182 |
| 10,553,387 | B1 * | 2/2020 | Angelini | H01H 69/02 |
| 2006/0012934 | A1 * | 1/2006 | Faulkner | H01H 85/12 361/104 |
| 2010/0218659 | A1 * | 9/2010 | Ukon | B23D 15/145 83/639.1 |
| 2012/0194954 | A1 | 8/2012 | Fukuyama et al. | |
| 2013/0056344 | A1 | 5/2013 | Borg | |
| 2014/0061161 | A1 | 3/2014 | Nakamura et al. | |
| 2014/0326122 | A1 | 11/2014 | Ukon et al. | |
| 2015/0200065 | A1 * | 7/2015 | Koetter | H01H 85/0039 218/117 |
| 2016/0343524 | A1 | 11/2016 | Gaudinat et al. | |
| 2016/0351363 | A1 | 12/2016 | Gaudinat et al. | |
| 2017/0263403 | A1 | 9/2017 | Marlin et al. | |
| 2018/0025879 | A1 * | 1/2018 | Ho | H01H 85/06 337/187 |
| 2019/0206645 | A1 | 7/2019 | Sakai et al. | |
| 2020/0279711 | A1 * | 9/2020 | Mathieu | H01H 85/0039 |

FOREIGN PATENT DOCUMENTS

| | | |
|---|---|---|
| JP | 2013-138004 | 7/2013 |
| JP | 2014-049272 | 3/2014 |
| JP | 2014-049300 | 3/2014 |
| JP | 2017-507469 | 3/2017 |
| JP | 2017-130447 | 7/2017 |
| JP | 2017-528900 | 9/2017 |
| JP | 2018-006081 | 1/2018 |
| JP | 2019-029152 | 2/2019 |

OTHER PUBLICATIONS

Official Communication issued in International Bureau of WIPO Patent Application No. PCT/JP2019/037750, dated Dec. 24, 2019, along with an English translation thereof.

Oct. 3, 2023 Japanese Office Action in corresponding JP 2020-550344 and English machine translation thereof.

* cited by examiner

INTERRUPTER AND INTERRUPTER SYSTEM

CROSS-REFERENCE TO RELATED APPLICATIONS

This application is a National Stage of International Application No. PCT/JP2019/037750 filed Sep. 26, 2019, which claims priority to Japanese Patent Application No. 2018-186906 filed on Oct. 1, 2018, the contents of each noted application is hereby incorporated by reference in its entirety.

TECHNICAL FIELD

The present disclosure generally relates to an interrupter and an interrupter system, and more particularly relates to an interrupter designed to interrupt an electric circuit by using a gas pressure and an interrupter system including a plurality of such interrupters.

BACKGROUND ART

Patent Literature 1 discloses a known circuit breaker (interrupter). The circuit breaker includes at least one electrical conductor designed to be connected to an electric circuit (or electrical path), a housing, a matrix, a punch, and an actuator (actuator pin) that uses a pyrotechnic. The pyrotechnic actuator is designed to advance, when ignited, its punch from a first position to a second position. When the punch advances from the first position to the second position, the punch and the matrix break the at least one electrical conductor into at least two separate parts.

Circuit breakers such as the one disclosed in Patent Literature 1 are sometimes required to improve their electric circuit interrupting capability.

CITATION LIST

Patent Literature

Patent Literature 1: JP 2017-507469 A

SUMMARY OF INVENTION

It is therefore an object of the present disclosure to provide an interrupter and interrupter system with improved electric circuit interrupting capability.

An interrupter according to an aspect of the present disclosure includes a gas producer, an actuator pin, and an electrical conductor. The gas producer produces a gas by burning a fuel. The actuator pin is driven under pressure of the gas produced by the gas producer. The electrical conductor electrically connects two terminals of an external electric circuit. The electrical conductor includes a first terminal portion, a first separable portion, a second terminal portion, and a second separable portion. The first separable portion is connected to the first terminal portion. The second terminal portion is electrically connected to the first terminal portion. The second separable portion is connected to the second terminal portion. The second separable portion is electrically connected to the first separable portion in parallel. The first separable portion is cut off from the first terminal portion by the actuator pin driven. The second separable portion is cut off from the second terminal portion by the actuator pin driven. A first timing when the first separable portion starts to be cut off from the first terminal portion is earlier than a second timing when the second separable portion starts to be cut off from the second terminal portion.

An interrupter according to another aspect of the present disclosure includes a gas producer, an actuator pin, an electrical conductor, and a mask. The gas producer produces a gas by burning a fuel. The actuator pin is driven under pressure of the gas produced by the gas producer. The electrical conductor electrically connects two terminals of an external electric circuit. The mask has electrical insulation properties. The electrical conductor includes a terminal portion, a separable portion, and a boundary portion. The separable portion is connected to the terminal portion. The boundary portion couples the terminal portion and the separable portion together. The separable portion is cut off from the terminal portion by the actuator pin driven. The terminal portion includes an adjacent portion. The adjacent portion is adjacent to the boundary portion. When measured in a predetermined direction, a dimension of the adjacent portion is larger than a dimension of the boundary portion. The predetermined direction intersects with a direction in which an electric current flows through the boundary portion. The mask covers the adjacent portion.

An interrupter according to still another aspect of the present disclosure includes a gas producer, an actuator pin, and an electrical conductor. The gas producer produces a gas by burning a fuel. The actuator pin is driven under pressure of the gas produced by the gas producer. The electrical conductor includes a separable portion and a terminal portion. The separable portion forms part of an electric circuit. The terminal portion is connected to the separable portion. The terminal portion forms another part of the electric circuit. The separable portion is cut off from the terminal portion by the actuator pin driven. A breaking strength of a boundary portion between the separable portion and the terminal portion is equal to or less than a breaking strength of a portion, located adjacent to the boundary portion, of the terminal portion.

An interrupter according to yet another aspect of the present disclosure includes a gas producer, an actuator pin, and an electrical conductor. The gas producer produces a gas by burning a fuel. The actuator pin is driven under pressure of the gas produced by the gas producer. The electrical conductor electrically connects two terminals of an external electric circuit. The electrical conductor includes a first terminal portion, a first separable portion, a second terminal portion, and a second separable portion. The first separable portion is connected to the first terminal portion. The second terminal portion is electrically connected to the first terminal portion. The second separable portion is connected to the second terminal portion. The second separable portion is electrically connected to the first separable portion in parallel. The actuator pin is movable in a first direction. The first separable portion and the second separable portion are extended in a second direction. The second direction is perpendicular to the first direction. At least the first separable portion is cut off from the first terminal portion by the actuator pin driven. Before the actuator pin is driven, when viewed in a third direction, a distance measured in the first direction between the actuator pin and the second separable portion is longer than a distance measured in the first direction between the actuator pin and the first separable portion. The third direction is perpendicular to both the first direction and the second direction.

An interrupter system according to yet another aspect of the present disclosure includes a plurality of the interrupters.

The plurality of the interrupters are electrically connected in series, parallel, or a combination of both series and parallel.

DESCRIPTION OF EMBODIMENTS

Interrupters and interrupter systems according to various embodiments will now be described with reference to the accompanying drawings. Note that the embodiments to be described below are only exemplary ones of various embodiments of the present disclosure and should not be construed as limiting. Rather, the exemplary embodiments may be readily modified in various manners depending on a design choice or any other factor without departing from the scope of the present disclosure. The drawings to be referred to in the following description of embodiments are all schematic representations. That is to say, the ratio of the dimensions (including thicknesses) of respective constituent elements illustrated on the drawings does not always reflect their actual dimensional ratio.

First Embodiment (1.1) Interrupter

Figure 1:
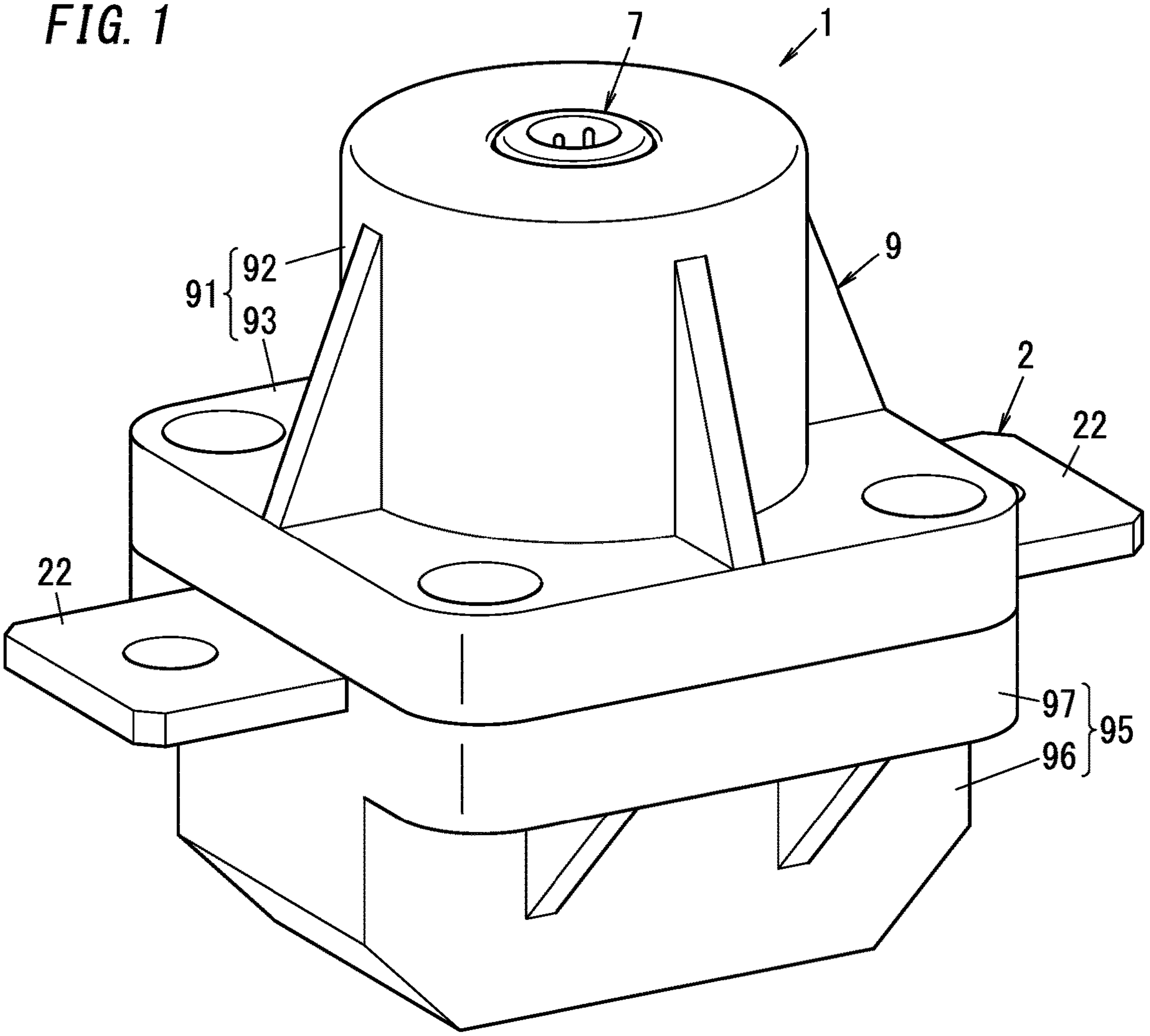
FIG. 1 is a perspective view of an interrupter according to a first embodiment.
Figure 2:
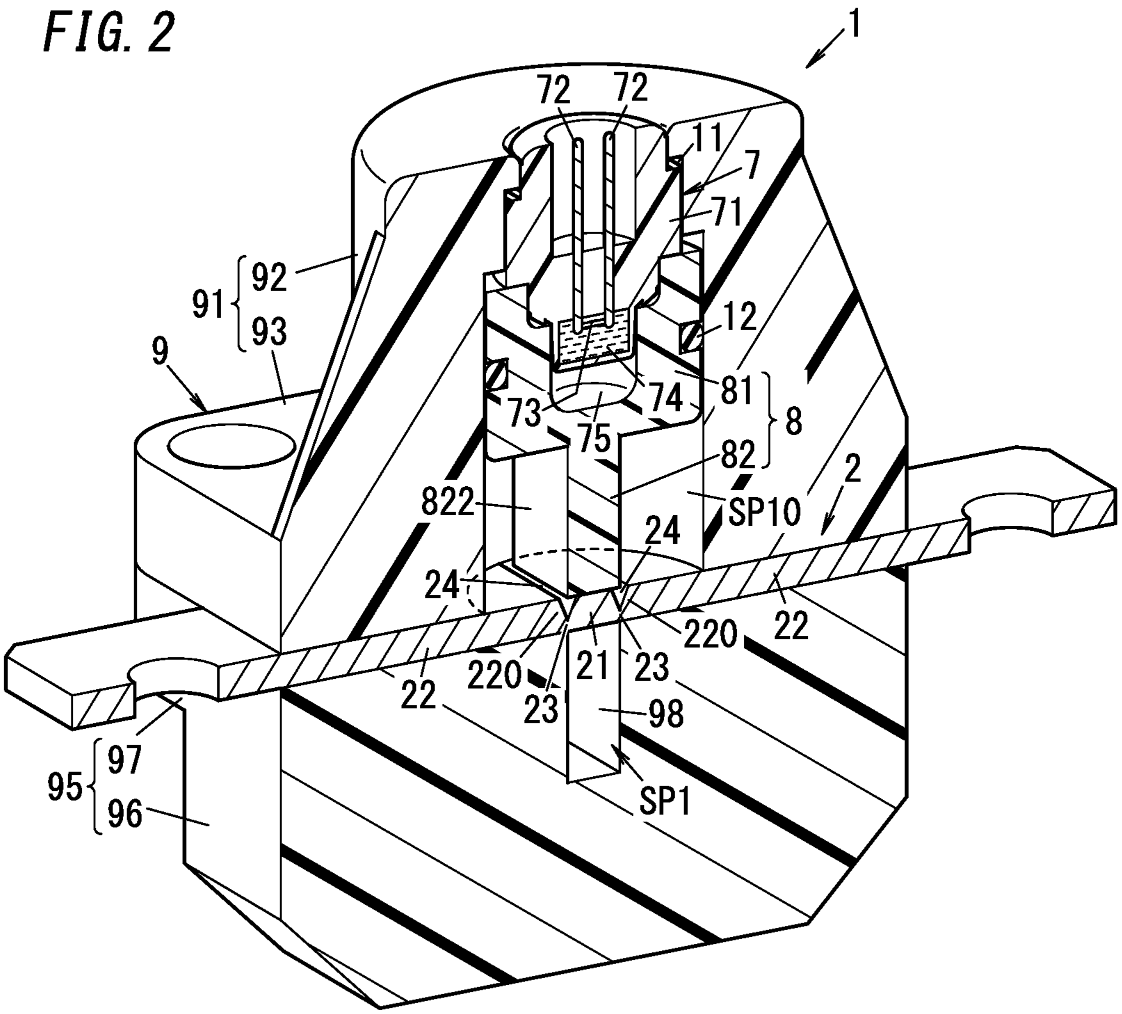
FIG. 2 is a cross-sectional perspective view of the interrupter.

An interrupter 1 according to an exemplary embodiment includes a gas producer 7, an electrical conductor 2, and an actuator pin 8 as shown in FIGS. 1 and 2. The interrupter 1 further includes a housing portion 9 (housing) having an internal space SP1. The internal space SP1 includes a housing space 98 and a drive space SP10.

The gas producer 7 contains a fuel 74. The fuel 74 is an explosive such as nitrocellulose, lead azide, a black explosive, or a glycidyl azide polymer. The gas producer 7 produces a gas by burning the fuel 74.

The electrical conductor 2 includes: a separable portion 21 forming part of an electric circuit; two terminal portions 22 (continuous portions) connected to the separable portion 21 and forming other parts of the electric circuit; and two boundary portions 23. At a point in time before the actuator pin 8 is driven, the separable portion 21 is arranged in the internal space SP1 of the housing portion 9. One of the two boundary portions 23 couples one of the two terminal portions 22 to the separable portion 21. The other of the two boundary portions 23 couples the other of the two terminal portions 22 to the separable portion 21. The separable portion 21, the two terminal portions 22, and the two boundary portions 23 form respective parts of a single continuous member.

When an abnormal electric current such as an overcurrent flows through an electric circuit including the electrical conductor 2, the fuel 74 is burned by the gas producer 7, thus producing a gas. The actuator pin 8 is driven under the pressure of the gas produced by the gas producer 7. Then, the boundary portions 23, located between the separable portion 21 and the two terminal portions 22, respectively, of the electrical conductor 2 are broken by the actuator pin 8, thus causing the separable portion 21 to be cut off from the two terminal portions 22 and thereby interrupting the electric circuit. The housing space 98 houses the separable portion 21 that has been cut off from the two terminal portions 22.

In the foregoing description, the boundary portions 23 are regarded as portions located between the terminal portions 22 and the separable portion 21. However, each boundary portion 23 between the separable portion 21 and an associated one of the two terminal portions 22 of the electrical conductor 2 will also be regarded as a portion, including a part of the separable portion 21 and a part of the terminal portion 22, of the electrical conductor 2.

Each of the two terminal portions 22 includes an adjacent portion 220. The adjacent portions 220 are adjacent to the boundary portions 23. Specifically, the two terminal portions 22 are associated one to one with the two boundary portions 23 and each terminal portion 22 is adjacent to an associated boundary portion 23 at the adjacent portion 220 thereof.

The breaking strength of the boundary portion 23 between the separable portion 21 and each of the two terminal portions 22 is equal to or less than the breaking strength of a portion, located adjacent to the boundary portion 23 (i.e., the adjacent portion 220), of the terminal portion 22. More suitably, the breaking strength of the boundary portion 23 between the separable portion 21 and each of the two terminal portions 22 is less than the breaking strength of the portion, located adjacent to the boundary portion 23 (i.e., the adjacent portions 220), of the terminal portion 22.

More suitably, the breaking strength of the boundary portion 23 between the separable portion 21 and each of the two terminal portions 22 is equal to or less than the breaking strength of the rest of the terminal portion 22 other than the boundary portion 23. Even more suitably, the breaking strength of the boundary portion 23 between the separable portion 21 and each of the two terminal portions 22 is less than the breaking strength of the rest of the terminal portion 22 other than the boundary portion 23. More specifically, in the portion, facing the internal space SP1 of the housing portion 9, of the electrical conductor 2, the boundary portion 23 between the separable portion 21 and each of the two terminal portions 22 suitably has the lowest breaking strength. Optionally, in the portion, facing the internal space SP1 of the housing portion 9, of the electrical conductor 2, the breaking strength of the boundary portion 23 between the separable portion 21 and each of the two terminal portions 22 may be equal to the breaking strength of the rest of the electrical conductor 2 (e.g., the separable portion 21) other than the boundary portion 23. That is to say, respective portions, facing the internal space SP1 of the housing portion 9, of the electrical conductor 2 may have the same breaking strength.

In the electrical conductor 2, the separable portion 21 is easily cut off from the two terminal portions 22. That is to say, in this interrupter 1, setting the breaking strength of the boundary portions 23 at a value equal to or less than the breaking strength of the respective portions, adjacent to the boundary portions 23 (i.e., adjacent portions 220), of the two terminal portions 22 allows the interrupter 1 to have improved electric circuit interrupting capability. In this embodiment, the breaking strength of the boundary portions 23 is less than the breaking strength of the rest of the two terminal portions 22 other than the boundary portions 23.

The electrical conductor 2 has a plate shape. More specifically, the electrical conductor 2 has a rectangular plate shape. The electrical conductor 2 may be made of copper, for example. The separable portion 21 and two terminal portions 22 of the electrical conductor 2 are formed integrally with each other. The separable portion 21 is provided between the two terminal portions 22. Along the length of the electrical conductor 2, one of the two terminal portions 22, the separable portion 21, and the other of the two terminal portions 22 are arranged in this order.

The electrical conductor 2 has two grooves 24. In other words, two grooves 24 are provided on the electrical conductor 2. These two grooves 24 divide the electrical conductor 2 into the separable portion 21 and the two terminal portions 22. That is to say, the boundary portions 23 of the electrical conductor 2 correspond to portions thereof provided with the grooves 24. More specifically, each groove 24 has a bottom portion thereof defined by the associated boundary portion 23 and has a side portion thereof defined by the associated adjacent portion 220. Since each boundary portion 23 has the groove 24, the breaking strength of each boundary portion 23 is smaller than the breaking strength of the rest of the associated terminal portion 22 other than the boundary portion 23. Out of a first surface F1 (see FIG. 3) and a second surface F2 (see FIG. 3), opposite from the first surface F1, of the electrical conductor 2, the grooves 24 are provided on the first surface F1. The first surface F1 is a surface facing the actuator pin 8. The second surface F2 is a surface facing the housing space 98. The depth of each groove 24 is aligned with the thickness of the electrical conductor 2. Each groove 24 has a triangular cross-sectional shape. In other words, each groove 24 has a wedge shape. Each groove 24 runs along the latitudinal axis of the electrical conductor 2.

Figure 3:
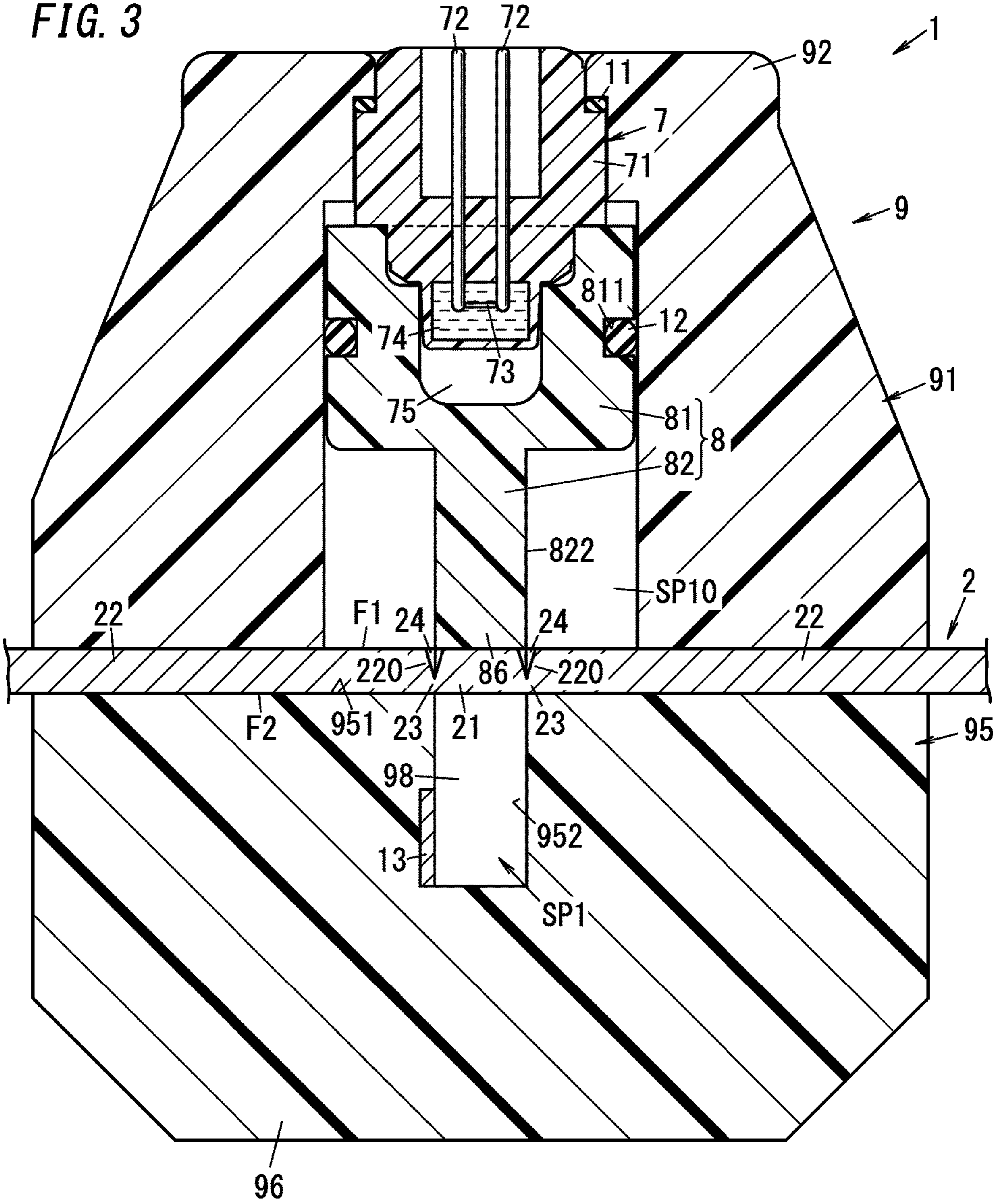
FIG. 3 is a cross-sectional view of the interrupter, illustrating its state before an actuator pin is driven.

When measured in the direction in which the actuator pin 8 advances (i.e., in the upward/downward direction on the paper on which FIG. 3 is drawn), the dimension of each adjacent portion 220 is larger than the dimension of the boundary portion 23 adjacent to the adjacent portion 220. That is to say, since the depth of the grooves 24 is aligned with the direction in which the actuator pin 8 advances, the adjacent portions 220 defining respective side portions of the grooves 24 have a larger dimension, as measured in the direction in which the actuator pin 8 advances, than the boundary portions 23 defining the bottom portions of the grooves 24.

The housing portion 9 may be made of a resin, for example. The housing portion 9 includes a first body 91 and a second body 95. The first body 91 includes a cylindrical portion 92 having a circular cylindrical shape and a first flange portion 93 protruding along the radius of the cylindrical portion 92 from one axial end of the cylindrical portion 92. The second body 95 includes a prismatic portion 96 having a prismatic shape and a second flange portion 97 protruding from one end, facing the first body 91, of the prismatic portion 96. The first flange portion 93 and the second flange portion 97 have the shapes of plates that are parallel to each other. The first body 91 and the second body 95 are joined together at the first flange portion 93 and the second flange portion 97. The electrical conductor 2 is passed between the first flange portion 93 and the second flange portion 97. One end of each of the two terminal portions 22 of the electrical conductor 2 protrudes out of the housing portion 9.

As shown in FIG. 3, a surface 951, facing the first body 91, of the second body 95 has a recess 952. The space inside the recess 952 defines the housing space 98 to house the separable portion 21 that has been cut off from the two terminal portions 22. The surface 951 of the second body 95 has a flat shape and is in contact with the electrical conductor 2. The separable portion 21 and the housing space 98 are aligned with a normal to the surface 951. When viewed along a normal to the surface 951, the separable portion 21 is slightly smaller than the housing space 98.

Inside the cylindrical portion 92 of the first body 91 (i.e., in the drive space SP10), arranged are the gas producer 7 and the actuator pin 8. A base 81 (to be described later) of the actuator pin 8 moves inside the drive space SP10.

The gas producer 7 includes not only the fuel 74 but also a case 71, two pin electrodes 72, and a heat generator 73. The case 71 has the shape of a hollow circular column. The interrupter 1 further includes a first O-ring 11 interposed between an outer periphery of the case 71 and an inner surface of the cylindrical portion 92.

The two pin electrodes 72 of the gas producer 7 are housed in the case 71. Respective first ends of the two pin electrodes 72 are exposed to the outside of the housing portion 9. Respective second ends of the two pin electrodes 72 are connected to the heat generator 73. The heat generator 73 is arranged in the space, housing the fuel 74, of the case 71.

The actuator pin 8 has electrical insulation properties. The actuator pin 8 may be made of a resin, for example. The actuator pin 8 is arranged between the gas producer 7 and the separable portion 21. The actuator pin 8 includes the base 81 and a protruding member 82 protruding from the base 81. Note that the actuator pin 8 does not have to have electrical insulation properties.

The base 81 has the shape of a bottomed circular cylinder. On the outer periphery of the base 81, provided is an annular groove 811 along the circumference of the base 81. The interrupter 1 further includes a second O-ring 12 fitted into the groove 811. The outer periphery of the second O-ring 12 is in contact with the inner surface of the cylindrical portion 92. The frictional force caused between the respective inner surfaces of the groove 811 and the cylindrical portion 92 and the second O-ring 12 allows the actuator pin 8 to be held by the cylindrical portion 92 inside the cylindrical portion 92.

The protruding member 82 has a rectangular parallelepiped shape. The protruding member 82 protrudes along the axis of the base 81 from an outer bottom surface of the base 81. The protruding member 82 forms an integral part of the base 81. The tip 86 of the protruding member 82 is in contact with the separable portion 21. When viewed in the direction in which the protruding member 82 protrudes, the separable portion 21 is approximately as large as the protruding member 82.

Between the case 71 of the gas producer 7 and the base 81 of the actuator pin 8, provided is a pressurizing chamber 75, which is a space to which the gas produced by the gas producer 7 is introduced.

Figure 4:
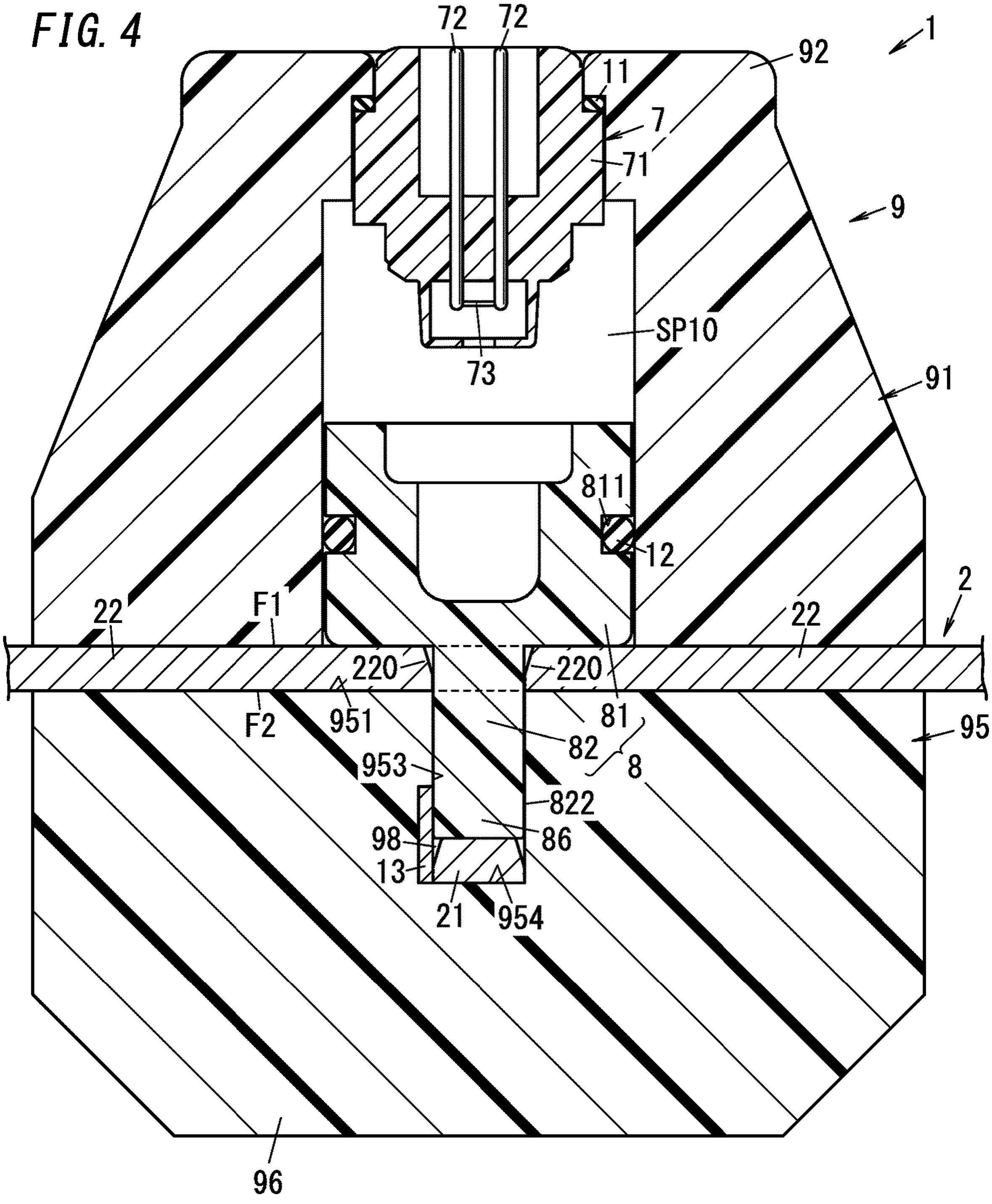
FIG. 4 is a cross-sectional view of the interrupter, illustrating its state after the actuator pin has been driven.

The heat generator 73 may be, for example, a nichrome wire or an alloy wire containing iron, chromium, and aluminum. The two pin electrodes 72 may be connected to, for example, a control circuit 207 (see FIG. 5) for controlling the operation of the interrupter 1. When an abnormal current such as an overcurrent flows through an electric circuit EC1 (see FIG. 5) including the electrical conductor 2, the control circuit 207 electrifies the two pin electrodes 72. When electrified via the two pin electrodes 72 of the gas producer 7, the heat generator 73 generates heat. The fuel 74 is ignited with the heat generated by the heat generator 73 to burn and produce a gas. The gas increases the pressure in the space, housing the fuel 74, of the case 71 to break the walls that form the space (see FIG. 4). Then, the gas is introduced through the broken parts into the pressurizing chamber 75 to cause an increase in the pressure in the pressurizing chamber 75. The pressure of the gas in the pressurizing chamber 75 applies force to the actuator pin 8 which presses and biases the actuator pin 8 toward the separable portion 21. The actuator pin 8 is driven by overcoming the frictional force applied by the second O-ring 12, thus causing the protruding member 82 of the actuator pin 8 to press the separable portion 21. The direction in which the actuator pin 8 advances is aligned with the direction in which the protruding member 82 of the actuator pin 8 protrudes. Before the separable portion 21 is cut off from the two terminal portions 22, the separable portion 21 is located between the actuator pin 8 and the housing space 98 in the direction in which the actuator pin 8 advances. As the separable portion 21 is pressed by the actuator pin 8, the electrical conductor 2 is broken along the two grooves 24 provided in the boundary portions 23 (see FIG. 3) between the separable portion 21 and the two terminal portions 22 as shown in FIG. 4. As a result, the separable portion 21 is cut off from the two terminal portions 22. The force is applied from the actuator pin 8 to the separable portion 21 in such a direction in which the separable portion 21 is brought closer to the housing space 98. Thus, the separable portion 21 that has been cut off from the two terminal portions 22 is pressed by the actuator pin 8 to enter the housing space 98.

The interrupter 1 further includes an arc quenching member 13 arranged in the housing space 98. The arc quenching member 13 is a member having an arc quenching function. The arc quenching member 13 is embedded in an inner surface (inner peripheral surface 953) of the second body 95 in the housing space 98. Alternatively, the arc quenching member 13 may be attached to the inner surface (inner peripheral surface 953) of the second body 95 in the housing space 98. Specifically, the arc quenching member 13 may be made of a hydrogen storing alloy, for example. The hydrogen storing alloy quenches the arc by releasing hydrogen.

The arc quenching member 13 does not have to be made of a hydrogen storing alloy. Examples of other materials for the arc quenching member 13 include SiC, $SiO_2$, alumina, polyamide (nylon) such as PA6, PA46, or PA66, and a material in which magnesium hydroxide or magnesium borate is added to the polyamide resin. The arc voltage may be increased by the arc quenching function of the arc quenching member 13 made of any of these materials.

As shown in FIG. 4, after the separable portion 21 has been cut off from the two terminal portions 22 by the actuator pin 8, the outer peripheral surface 822 of the actuator pin 8 that has been driven under the pressure of the gas produced by the gas producer 7 comes into contact with the inner surface (inner peripheral surface 953) of the housing space 98 of the housing portion 9 (second body 95). This confines, between the inner peripheral surface 953 of the housing portion 9 and the outer peripheral surface 822 of the actuator pin 8, the movable range of constituent particles of the arc generated between the separable portion 21 and the two terminal portions 22. For example, if there is any narrow gap between the inner peripheral surface 953 of the housing portion 9 and the outer peripheral surface 822 of the actuator pin 8, then the movable range of constituent particles of the arc is confined to that gap. This causes the constituent particles of the arc to collide against each other more frequently, thus increasing the arc voltage and thereby allowing the interrupter 1 to have improved arc quenching capability. As used herein, the constituent particles of the arc refer to electrons, metallic vapor, and plasma particles, for example.

Also, after the separable portion 21 has been cut off from the two terminal portions 22 by the actuator pin 8, the actuator pin 8 that has been driven under the pressure of the gas produced by the gas producer 7 pinches the separable portion 21 between the tip 86 of the actuator pin 8 in the direction in which the actuator pin 8 advances (i.e., the tip of the protruding member 82) and the inner surface (inner bottom surface 954) of the housing space 98 of the housing portion 9. Thus, the arc generated between the separable portion 21 and the two terminal portions 22 is compressed either between the inner bottom surface 954 of the housing portion 9 and the separable portion 21 or between the separable portion 21 and the tip 86 of the actuator pin 8. This causes constituent particles of the arc to collide against each other more frequently, thus increasing an arc voltage and thereby allowing the interrupter 1 to have improved arc quenching capability.

In this embodiment, the two grooves 24 do not have to be provided on the first surface F1 of the electrical conductor 2 but may be provided on the second surface F2 thereof. Alternatively, one or more grooves 24 may be provided on each of the first surface F1 and the second surface F2. In that case, the groove(s) 24 provided on the first surface F1 and the groove(s) 24 provided on the second surface F2 may or may not be aligned with each other along the thickness of the electrical conductor 2.

Also, in the electrical conductor 2, the boundary portions 23 between the separable portion 21 and the two terminal portions 22 may have a single or a plurality of holes instead of the grooves 24.

Furthermore, the terminal portions 22 have only to have electrical conductivity and form parts of the electric circuit EC1. For example, the terminal portions 22 may have no ability to allow a cable to be connected thereto.

Furthermore, when the actuator pin 8 is not driven by the gas producer 7, the tip 86 of the protruding member 82 of the actuator pin 8 does not have to be in contact with the separable portion 21 but may be out of contact with, and face, the separable portion 21.

Furthermore, the separable portion 21 does not have to be cut off from both of the two terminal portions 22 but may be cut off from at least one of the two terminal portions 22.

(1.2) Interrupter System

An interrupter system 100 according to the first embodiment will be described with reference to FIG. 5.

The interrupter system 100 includes a plurality of (e.g., two in the example illustrated in FIG. 5) interrupters 1. The plurality of interrupters 1 are electrically connected in series. Specifically, the two terminal portions 22 of the plurality of interrupters 1 are electrically connected in series. Optionally, the interrupter system 100 may include only one interrupter 1.

The interrupter system 100 may be provided for a power supply system 200, for example. The power supply system 200 may be provided for, for example, a vehicle 300 such as an electric vehicle. The vehicle 300 includes the power supply system 200, an inverter 3001, a motor 3002, and a capacitor 3003. The motor 3002 is connected to the power supply system 200 via the inverter 3001.

An electric circuit EC1 is formed by the power supply system 200, the inverter 3001, cables between the power supply system 200 and the inverter 3001, and other components. In addition, an external electric circuit EC10 for the interrupters 1 is formed by cables outside of the interrupters 1 and other components of the power supply system 200. The external electric circuit EC10 has four terminals 208. The four terminals 208 may be screw terminals, electric wires such as copper wires, or connector terminals, for example. Alternatively, the four terminals 208 may also be parts of a conductor formed on a substrate, for example.

Two terminals 208 out of the four terminals 208 correspond to the two terminal portions 22 of one of the two interrupters 1. The other two terminals 208 out of the four terminals 208 correspond to the two terminal portions 22 of the other of the two interrupters 1. The two terminal portions 22 of each interrupter 1 are electrically connected to their corresponding two terminals 208. That is to say, the two terminal portions 22 of each interrupter 1 correspond one to one to the two terminals 208 and are electrically connected to their corresponding terminals 208. The electrical conductor 2 of each interrupter 1 electrically connects the two terminals 208 of the external electric circuit EC10 via the two terminal portions 22.

The power supply system 200 includes a battery 201. The power supply system 200 supplies DC power of the battery 201 to the inverter 3001. The inverter 3001 converts the DC power provided by the power supply system 200 into AC power and supplies the AC power to the motor 3002, thereby driving the motor 3002 and propelling the vehicle 300. The motor 3002 may be a three-phase AC synchronous motor, for example.

The capacitor 3003 is connected between a first terminal T1 (input terminal with the higher potential) of the inverter 3001 and a second terminal T2 (input terminal with the lower potential) of the inverter 3001.

The power supply system 200 includes not only the interrupter system 100 and the battery 201 but also a first relay 202, a second relay 203, a resistor 204, a third relay 205, a shunt resistor 206, and a control circuit 207.

The terminal portion 22 at a first end of the series circuit of the plurality of interrupters 1 is connected to the first terminal T1 of the inverter 3001 via the battery 201 and the second relay 203. The terminal portion 22 at a second end of the series circuit of the plurality of interrupters 1 is connected to the second terminal T2 of the inverter 3001 via the shunt resistor 206 and the first relay 202.

A series circuit of the resistor 204 and the third relay 205 is connected to the second relay 203 in parallel.

The control circuit 207 controls the operation of the plurality of interrupters 1, the first relay 202, the second relay 203, and the third relay 205. The control circuit 207 is a constituent element that forms part of an electronic control unit (ECU) for the vehicle 300. The control circuit 207 is implemented as, for example, a computer (microcomputer) including a processor and a memory. The computer performs the function of the control circuit 207 according to the present disclosure by making the processor execute a program stored in the memory of the computer.

When the voltage across the shunt resistor 206 becomes equal to or greater than a prescribed value, the control circuit 207 supplies an electric current to the two pin electrodes 72 (see FIG. 2) of each of the plurality of interrupters 1. Then, in each interrupter 1, the gas producer 7 (see FIG. 2) drives the actuator pin 8 (see FIG. 2), thus causing the interrupter 1 to interrupt the electric circuit EC1. The prescribed value may be 2 kA, for example. An electric current, of which the current value is equal to or greater than the prescribed value, corresponds to an overcurrent generated when a short-circuit occurs in the electric circuit EC1.

In addition, when the voltage across the shunt resistor 206 becomes equal to or greater than the prescribed value, the control circuit 207 operates the first relay 202, thereby interrupting the electric circuit EC1.

When the power supply system 200 starts to supply power to the motor 3002 via the inverter 3001, the control circuit 207 closes the third relay 205 and the first relay 202 to charge the capacitor 3003 with electricity. This reduces an inrush current to flow toward the motor 3002. After the capacitor 3003 has been charged, the control circuit 207 opens the third relay 205 and closes the second relay 203.

The plurality of interrupters 1 do not have to be electrically connected in series but may also be electrically connected in parallel or a combination of both series and parallel.

Resume of First Embodiment

The first embodiment described above may be a specific implementation of the following aspects of the present disclosure.

In the interrupter 1 according to the first embodiment, the breaking strength of the boundary portion 23 between the separable portion 21 and each terminal portion 22 is equal to or less than the breaking strength of a portion, adjacent to the boundary portion 23, of the terminal portion 22.

According to this configuration, an electric circuit EC1 is interrupted when the separable portion 21 is cut off from the terminal portion 22. In this case, since the breaking strength of the boundary portion 23 between the separable portion 21 and the terminal portion 22 is equal to or less than the breaking strength of the adjacent portion 220, the separable portion 21 is easily cut off from the terminal portion 22. That is to say, this allows the interrupter 1 to have improved capability for interrupting the electric circuit EC1.

Also, in the interrupter 1 according to the first embodiment, the boundary portion 23, located between the separable portion 21 and each terminal portion 22, of the electrical conductor 2 has a groove 24.

This configuration allows the separable portion 21 to be cut off from the terminal portion 22 along the groove 24, thus facilitating cutting off the separable portion 21 from the terminal portion 22 compared to a situation where no grooves 24 are provided.

Furthermore, the interrupter 1 according to the first embodiment further includes a housing portion 9. The housing portion 9 has a housing space 98. The housing space 98 houses the separable portion 21 cut off from the terminal portion 22.

This configuration extends, compared to a situation where no housing space 98 is provided, a creepage distance for insulation between the terminal portion 22 and the separable portion 21 cut off from the terminal portion 22, thus facilitating cutting off an arc generated between the separable portion 21 and the terminal portion 22.

In addition, the interrupter 1 according to the first embodiment further includes the arc quenching member 13. The arc quenching member 13 has an arc quenching function. The arc quenching member 13 is arranged in the housing space 98.

This configuration allows the interrupter 1 to have improved arc quenching capability.

In addition, in the interrupter 1 according to the first embodiment, after the separable portion 21 has been cut off from the terminal portion 22 by the actuator pin 8, the outer peripheral surface 822 of the actuator pin 8 is in contact with the inner surface (inner peripheral surface 953) of the housing space 98 of the housing portion 9.

This configuration allows the arc to be distributed in only a confined range between the inner surface (inner peripheral surface 953) of the housing space 98 of the housing portion 9 and the outer peripheral surface 822 of the actuator pin 8. This causes constituent particles of the arc to collide against each other more frequently, thus increasing an arc voltage and thereby allowing the interrupter 1 to have improved arc quenching capability.

Furthermore, in the interrupter 1 according to the first embodiment, after the separable portion 21 has been cut off from the terminal portion 22 by the actuator pin 8, the actuator pin 8 pinches the separable portion 21 between the tip 86 of the actuator pin 8 in the direction in which the actuator pin 8 advances and the inner surface (inner bottom surface 954) of the housing space 98 of the housing portion 9.

According to this configuration, the arc generated between the separable portion 21 and the terminal portion 22 is compressed either between the inner surface (inner bottom surface 954) of the housing space 98 of the housing portion 9 and the separable portion 21 or between the separable portion 21 and the tip 86 of the actuator pin 8. This causes constituent particles of the arc to collide against each other more frequently, thus increasing an arc voltage and thereby allowing the interrupter 1 to have improved arc quenching capability.

The interrupter system 100 according to the first embodiment includes a plurality of the interrupters 1. The plurality of the interrupters 1 are electrically connected in series, parallel, or a combination of both series and parallel.

This configuration improves the electric circuit EC1 interrupting capability compared to a situation where only one interrupter 1 is provided.

Second Embodiment

Figure 6:
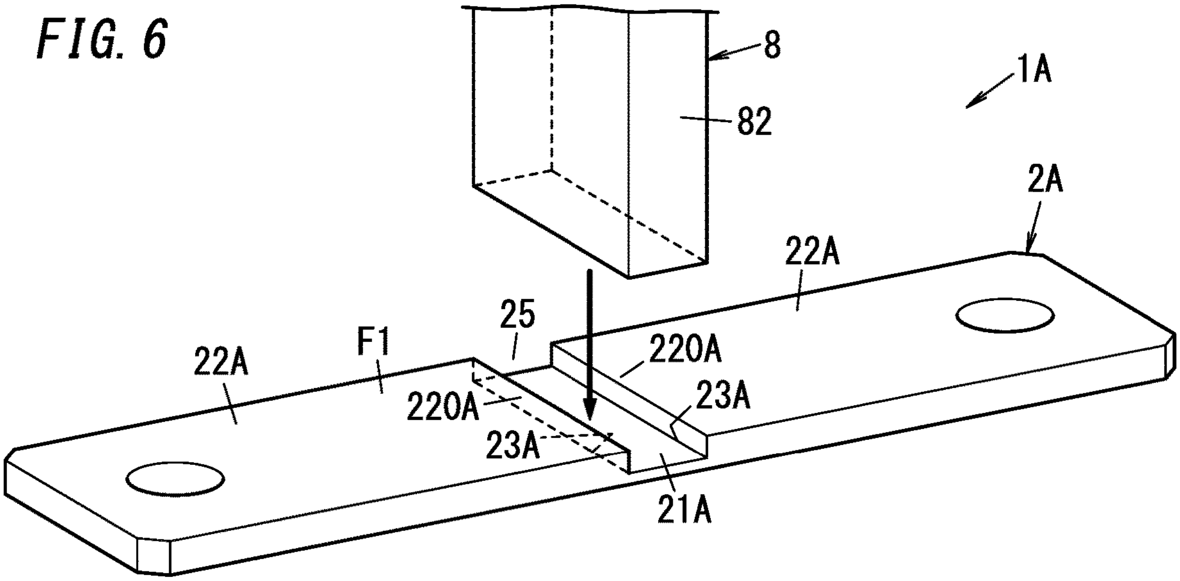
FIG. 6 is a perspective view illustrating a principal part of an interrupter according to a second embodiment.

An interrupter 1A according to a second embodiment will now be described with reference to FIG. 6. In the following description, any constituent element of this second embodiment, having the same function as a counterpart of the first embodiment described above, will be designated by the same reference numeral as that counterpart's, and description thereof will be omitted herein.

In the interrupter 1A according to this embodiment, the electrical conductor 2A has a different shape from the electrical conductor 2 according to the first embodiment. When measured in the direction in which the actuator pin 8 advances, the dimension of the separable portion 21A is smaller than the dimension of the two terminal portions 22A adjacent to the separable portion 21A. That is to say, the separable portion 21A is less thick than the two terminal portions 22A. The first surface F1 of the separable portion 21A is recessed at the separable portion 21A. Thus, the breaking strength of the boundary portion 23A between the separable portion 21A and each terminal portion 22A is smaller than the breaking strength of the rest of the terminal portion 22A other than the boundary portion 23A.

When measured in the direction in which the actuator pin 8 advances, the dimension of each adjacent portion 220A is larger than the dimension of the boundary portion 23A adjacent to the adjacent portion 220A. Note that when measured in the direction in which the actuator pin 8 advances, the dimension of each adjacent portion 220A is equal to the dimension of the rest of the associated terminal portion 22A other than the adjacent portion 220A.

In this embodiment, not the first surface F1 of the electrical conductor 2A but the second surface F2 thereof (see FIG. 3) may be recessed at the separable portion 21A. Alternatively, the first surface F1 and second surface F2 of the electrical conductor 2A may be both recessed at the separable portion 21A.

As in the first embodiment, the groove 24 (see FIG. 3) may also be provided in this embodiment in the boundary portion 23A between the separable portion 21A and each terminal portion 22A of the electrical conductor 2A.

Resume of Second Embodiment

The second embodiment described above may be a specific implementation of the following aspect of the present disclosure.

In the interrupter 1A according to the second embodiment, when measured in the direction in which the actuator pin 8 advances, the dimension of the separable portion 21A is smaller than the dimension of each terminal portion 22A adjacent to the separable portion 21A.

This configuration facilitates cutting off the separable portion 21A from each terminal portion 22A.

Third Embodiment

Figure 7:
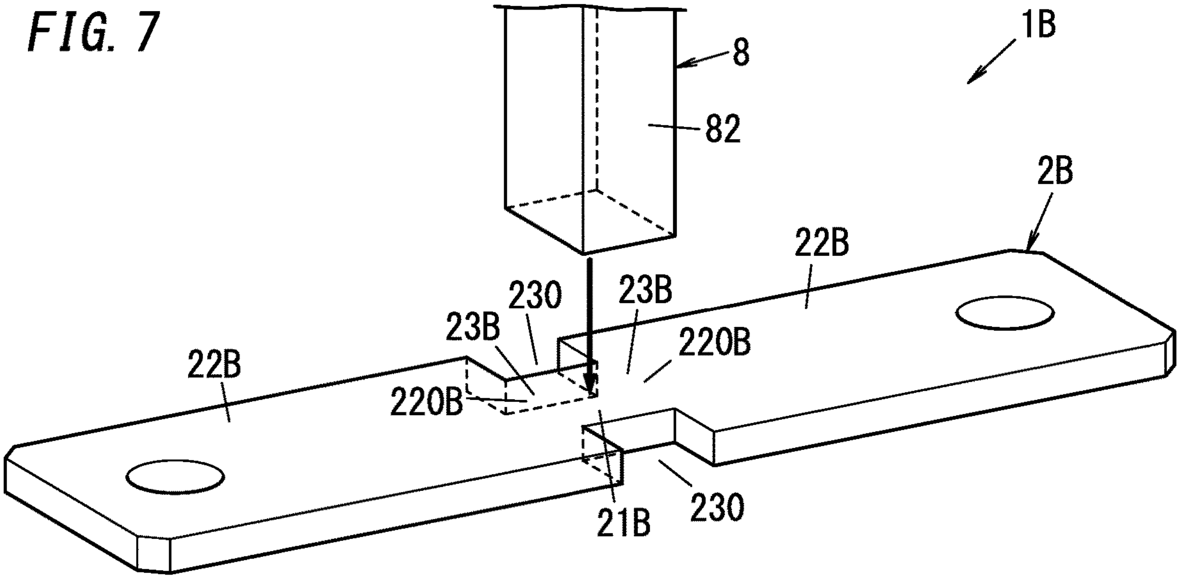
FIG. 7 is a perspective view illustrating a principal part of an interrupter according to a third embodiment.

An interrupter 1B according to a third embodiment will now be described with reference to FIG. 7. In the following description, any constituent element of this third embodiment, having the same function as a counterpart of the first embodiment described above, will be designated by the same reference numeral as that counterpart's, and description thereof will be omitted herein.

In the interrupter 1B according to this embodiment, the electrical conductor 2B has a different shape from the electrical conductor 2 according to the first embodiment. When measured in a direction perpendicular to the direction in which the actuator pin 8 advances and a direction in which an electric current flows through the electrical conductor 2B, the dimension of the separable portion 21B is smaller than the dimension of the two terminal portions 22B. The direction in which the actuator pin 8 advances is aligned with the thickness of the separable portion 21B. The direction in which an electric current flows through the electrical conductor 2B is aligned with the longitudinal axis of the electrical conductor 2B. Thus, in the electrical conductor 2B according to this embodiment, when measured along the latitudinal axis of the electrical conductor 2B, the dimension of the separable portion 21B is smaller than the dimension of the two terminal portions 22B. In the separable portion 21B, the electrical conductor 2B is recessed from both sides along the latitudinal axis thereof. That is to say, the electrical conductor 2B has two recesses 230.

Thus, the breaking strength of the boundary portion 23B between the separable portion 21B and each terminal portion 22B is smaller than the breaking strength of the rest of the terminal portion 22B other than the boundary portion 23B.

When measured in the direction perpendicular to the direction in which the actuator pin 8 advances and the direction in which the electric current flows through each boundary portion 23B (i.e., when measured along the latitudinal axis of the electrical conductor 2B), the dimension of the boundary portion 23B is equal to the dimension of the separable portion 21B.

When measured in a direction perpendicular to the direction in which the actuator pin 8 advances and intersecting with the direction in which the electric current flows through each boundary portion 23B (i.e., when measured along the latitudinal axis of the electrical conductor 2B), the dimension of each adjacent portion 220B is larger than the dimension of the boundary portion 23B adjacent to the adjacent portion 220B. Specifically, the difference in dimension between the adjacent portion 220B and the boundary portion 23B is equal to the sum of the respective lengths of the two recesses 230 provided for the electrical conductor 2B.

Optionally, in this embodiment, the electrical conductor 2B may be recessed at the separable portion 21B from either side along the latitudinal axis of the electrical conductor 2B.

As in the first embodiment, the groove 24 (see FIG. 3) may also be provided in this embodiment in the boundary portion 23B between the separable portion 21B and each terminal portion 22B of the electrical conductor 2B.

In addition, as in the second embodiment described above, when measured in the direction in which the actuator pin 8 advances, the dimension of the separable portion 21B may also be smaller in this embodiment than the dimension of the two terminal portions 22B.

Resume of Third Embodiment

The third embodiment described above may be a specific implementation of the following aspect of the present disclosure.

In the interrupter 1B according to the third embodiment, when measured in the direction perpendicular to the direction in which the actuator pin 8 advances and the direction in which the electric current flows through the electrical conductor 2B, the dimension of the separable portion 21B is smaller than the dimension of each terminal portion 22B.

This configuration facilitates cutting off the separable portion 21B from the terminal portions 22B.

Fourth Embodiment

Figure 8:
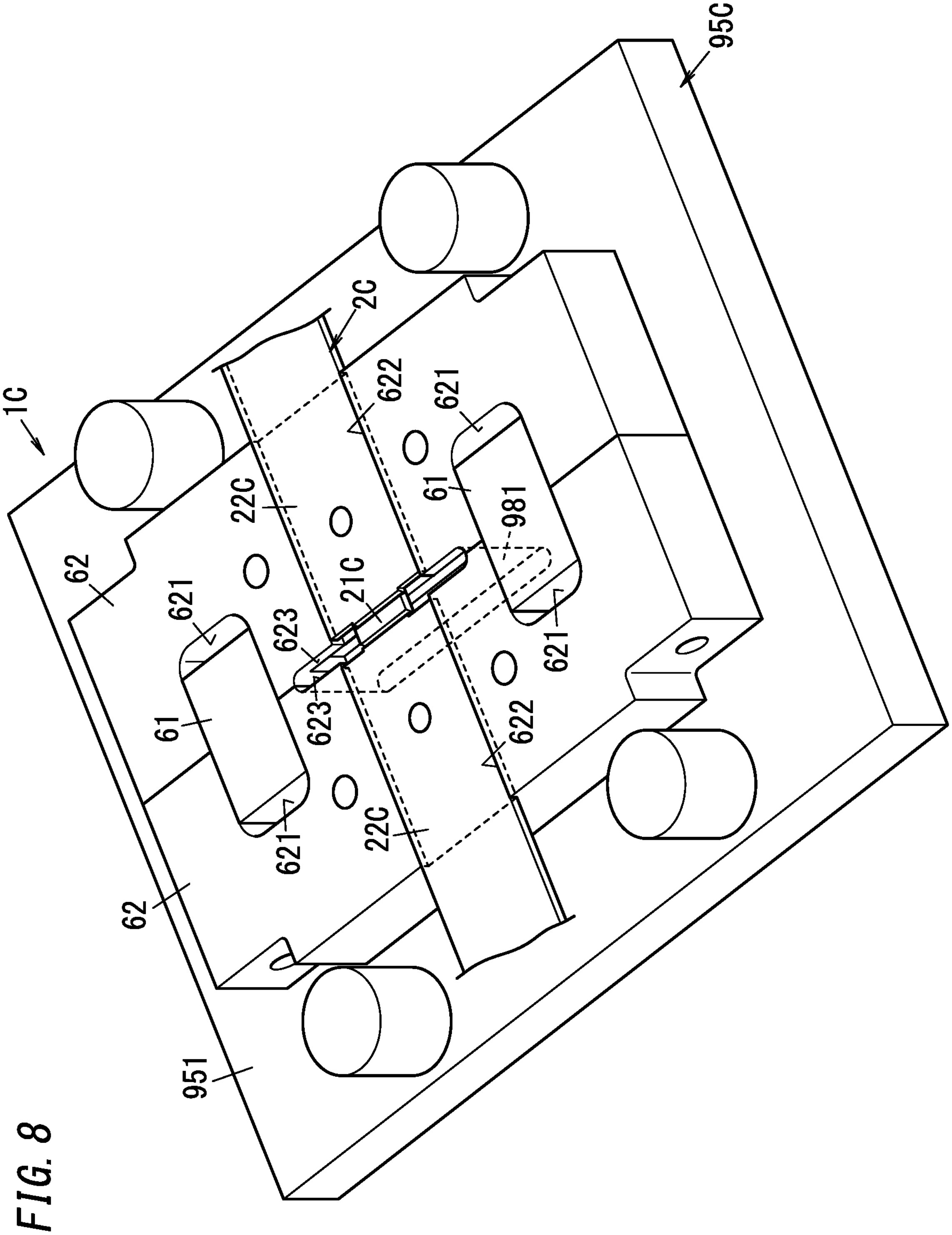
FIG. 8 is a perspective view illustrating a principal part of an interrupter according to a fourth embodiment.

An interrupter 1C according to a fourth embodiment will now be described with reference to FIGS. 8, 9A, and 9B. In the following description, any constituent element of this fourth embodiment, having the same function as a counterpart of the first embodiment described above, will be designated by the same reference numeral as that counterpart's, and description thereof will be omitted herein.

The interrupter 1C further includes a plurality of (e.g., two in the example illustrated in FIG. 8) permanent magnets 61. As in the first embodiment described above, the separable portion 21C is also located between the actuator pin 8 and the housing space 98C in the direction in which the actuator pin 8 advances. The plurality of permanent magnets 61 are arranged to apply Lorentz force to an electric current flowing through the electrical conductor 2C such that the Lorentz force is directed from the electrical conductor 2C toward the housing space 98C.

The interrupter 1C further includes a plurality of (e.g., two in the example illustrated in FIG. 8) positioning members 62. Each of the two positioning members 62 may be made of a resin, for example. The two positioning members 62 are mounted onto a surface 951, facing the first body 91C, of the second body 95C of the housing portion 9C.

Each positioning member 62 has two recesses 621. The two recesses 621 of one positioning member 62 correspond one to one to the two recesses 621 of the other positioning member 62. The two positioning members 62 are in contact with each other and each pair of recesses 621 facing each other are connected together.

The two permanent magnets 61 are positioned between the two positioning members 62. More specifically, one permanent magnet 61 is arranged inside one pair of recesses 621, facing each other, of the two positioning members 62 and the other permanent magnet 61 is arranged inside the other pair of recesses 621, facing each other, of the two positioning members 62.

One of the two positioning members 62 has a groove 622, to which one of the two terminal portions 22C of the electrical conductor 2C is fitted. The other of the two positioning members 62 has a groove 622, to which the other of the two terminal portions 22C of the electrical conductor 2C is fitted.

Each positioning member 62 has a recess 623. The respective recesses 623 of the two positioning members 62 are connected together. The space 981 inside the respective recesses 623 of the two positioning members 62 forms part of the housing space 98C to house the separable portion 21C that has been cut off from the two terminal portions 22C. The second body 95 has a recess 952C connected to the space 981 which faces the separable portion 21C via the respective recesses 623 of the two positioning members 62. The space 982 inside the recess 952C forms part of the housing space 98C.

An arc quenching member 13 is attached to the inner surface of the recess 623 of each positioning member 62. Alternatively, the arc quenching member 13 may be embedded in the inner surface of the recess 623.

As in the first embodiment described above, the electrical conductor 2C also has two grooves 24. Both latitudinal ends of the electrical conductor 2C are recessed at the separable portion 21C.

Figure 9A:
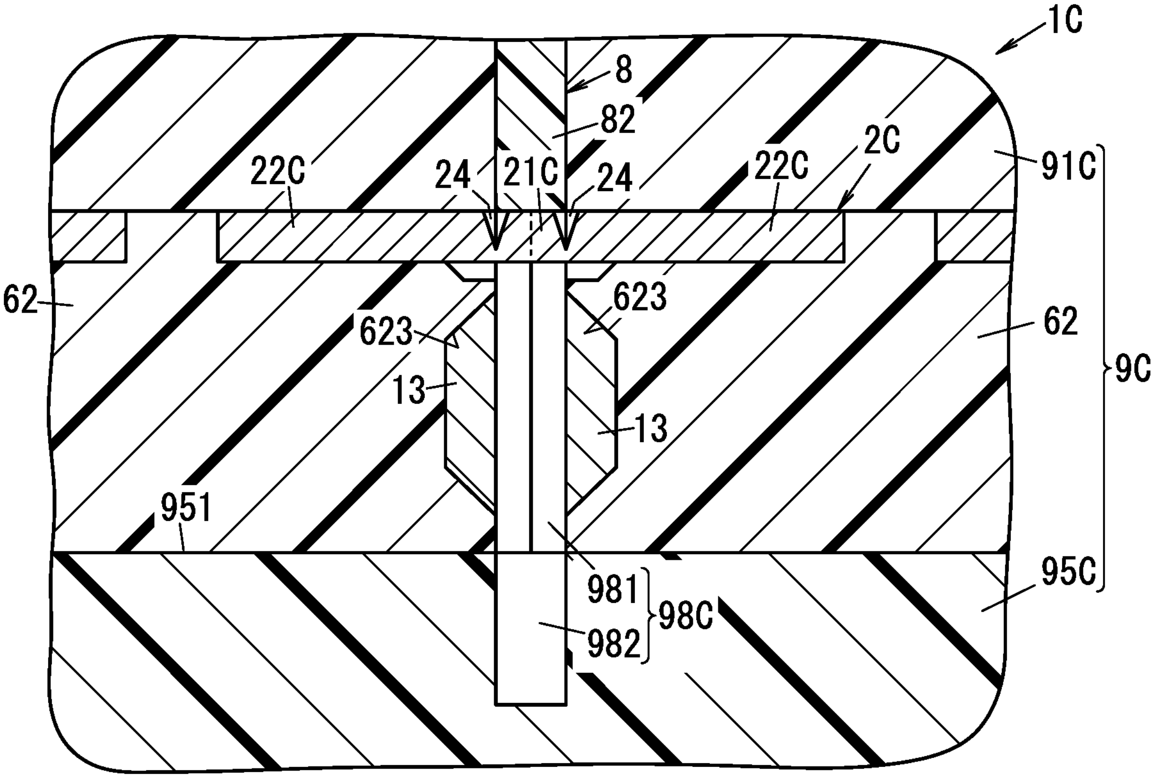
FIG. 9A is a cross-sectional view of a principal part of the interrupter, illustrating its state before an actuator pin is driven.

Through the electrical conductor 2C, an electric current flows, for example, to the right on the paper on which FIG. 9A is drawn. The two permanent magnets 61 are arranged along a normal to the paper on which FIG. 9A is drawn. The permanent magnet 61 located behind the paper on which FIG. 9A is drawn (i.e., located more distant from the viewer who is looking straight at FIG. 9A) orients its N pole toward the permanent magnet 61 located in front of the paper on which FIG. 9A is drawn (i.e., located closer to the viewer who is looking straight at FIG. 9A). The permanent magnet 61 located in front of the paper on which FIG. 9A is drawn orients its S pole toward the permanent magnet 61 located behind the paper on which FIG. 9A is drawn. The magnetic flux generated by the two permanent magnets 61 causes Lorentz force to be applied to an electric current flowing through the electrical conductor 2C such that the Lorentz force is directed toward the housing space 98C. That is to say, Lorentz force is applied downward (on the paper on which FIG. 9A is drawn) to the electric current flowing through the electrical conductor 2C. Thus, when the separable portion 21C is cut off from the two terminal portions 22C, the arc around each terminal portion 22C is stretched toward the housing space 98C.

Figure 9B:
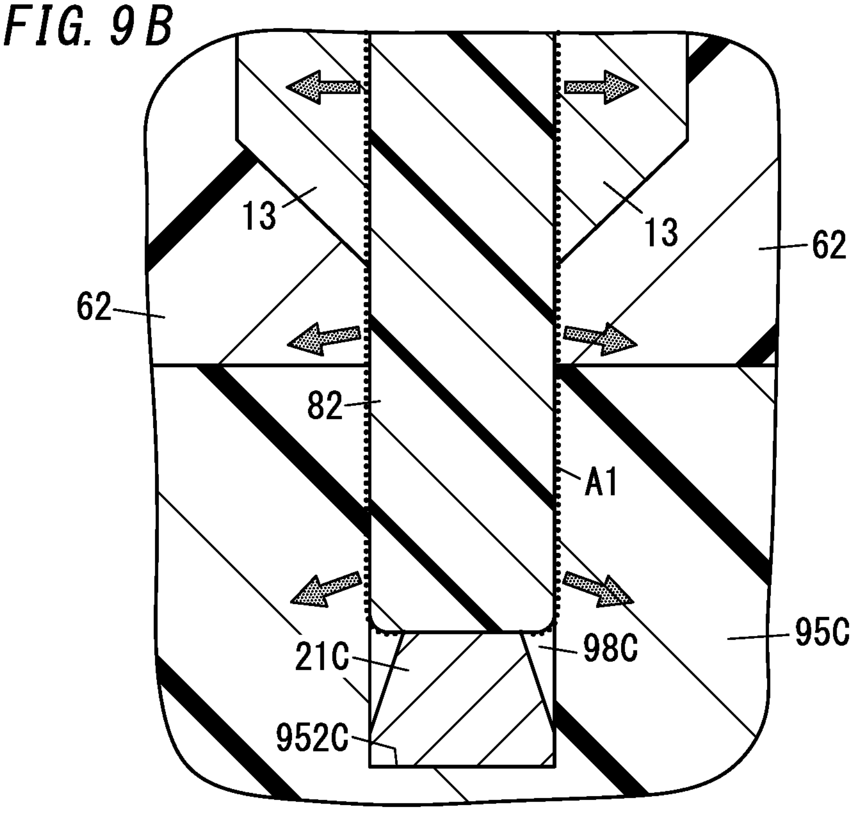
FIG. 9B is a cross-sectional view of the principal part of the interrupter, illustrating its state after the actuator pin has been driven.

Also, as indicated by the bold arrows in FIG. 9B, Lorentz force directed toward the inner surface of the housing space 98C is applied to the arc A1 generated between the two terminal portions 22C and the separable portion 21C cut off from the two terminal portions 22C. This causes the arc A1 to move toward the arc quenching member 13 provided on the inner surface of the housing space 98C. This allows the interrupter 1C to have the arc A1 cut off easily by the arc quenching member 13.

In this embodiment, two permanent magnets 61 are provided. However, this is only an example of the present disclosure and should not be construed as limiting. Alternatively, the number of the permanent magnet(s) 61 provided may also be one or three or more.

Resume of Fourth Embodiment

The fourth embodiment described above may be a specific implementation of the following aspect of the present disclosure.

An interrupter 1C according to the fourth embodiment further includes a permanent magnet 61. In a direction in which the actuator pin 8 advances, the separable portion 21C is located between the actuator pin 8 and the housing space 98C. The permanent magnet 61 is arranged to apply Lorentz force to an electric current flowing through the electrical conductor 2C. The Lorentz force is directed toward the housing space 98C.

This configuration allows the arc generated when the separable portion 21C is cut off from the terminal portions 22C to be stretched toward the housing space 98C by the Lorentz force applied to the arc.

Fifth Embodiment

Figure 10:
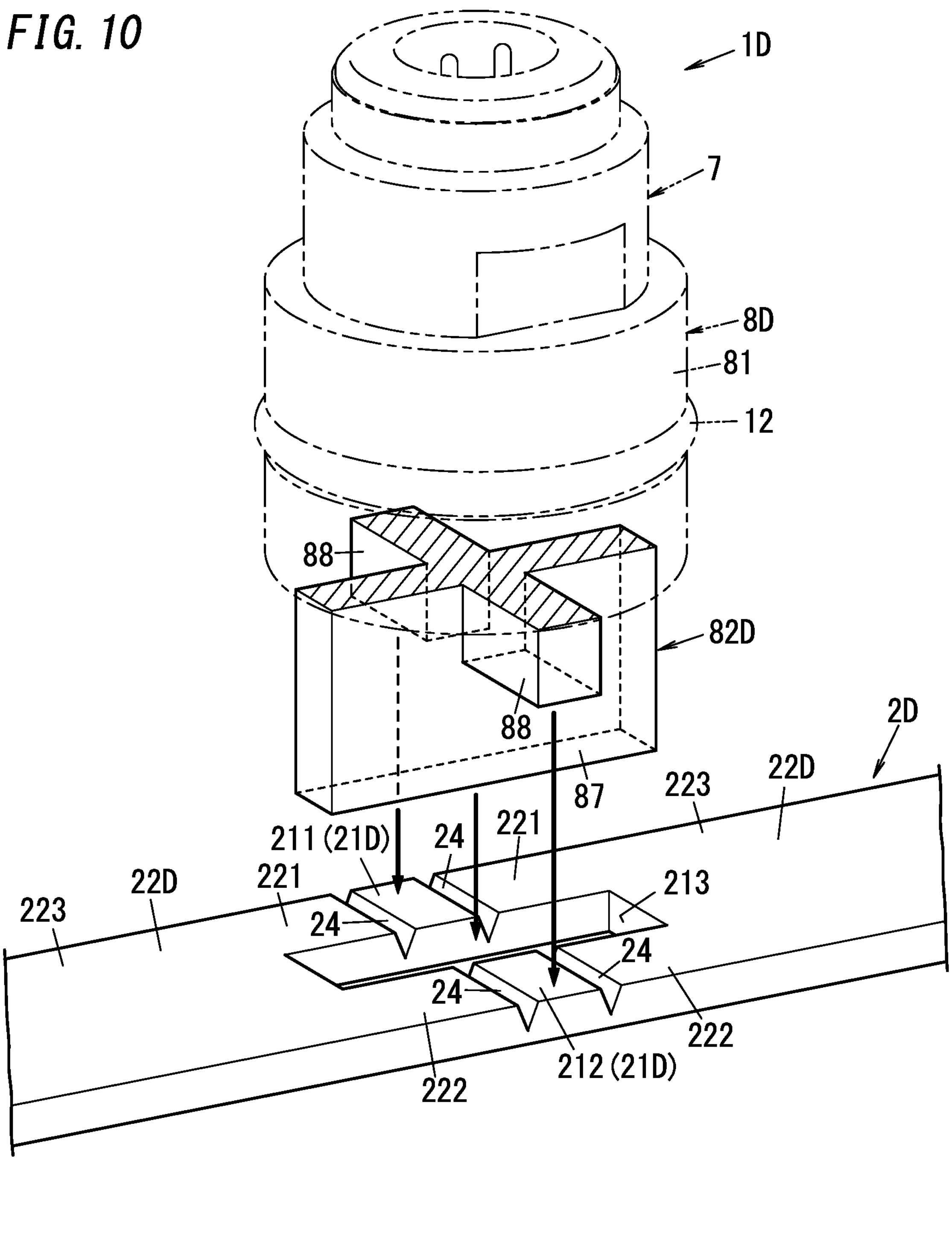
FIG. 10 is a perspective view of a principal part of an interrupter according to a fifth embodiment.

An interrupter 1D according to a fifth embodiment will now be described with reference to FIG. 10. In the following description, any constituent element of this fifth embodiment, having the same function as a counterpart of the first embodiment described above, will be designated by the same reference numeral as that counterpart's, and description thereof will be omitted herein.

In the interrupter 1D, the electrical conductor 2D includes a plurality of separable portions 21D. More specifically, the electrical conductor 2D includes two separable portions 21D. In the following description, when there is a need to distinguish them from each other, the two separable portions 21D will be hereinafter sometimes referred to as a "first separable portion 211" and a "second separable portion 212," respectively.

The electrical conductor 2D includes two terminal portions 22D, the first separable portion 211, and the second separable portion 212. Each of the two terminal portions 22D includes a terminal portion body 223, a first terminal part 221, and a second terminal part 222. That is to say, the electrical conductor 2D includes two first terminal parts 221 and two second terminal parts 222. The first separable portion 211 is connected to the two first terminal parts 221. The second separable portion 212 is connected to the two second terminal parts 222. The second separable portion 212 is electrically connected to the first separable portion 211 in parallel via the first terminal parts 221 and the second terminal parts 222.

At a point in time before the actuator pin 8 is driven, the first separable portion 211 and the second separable portion 212 are housed in the housing portion 9 (housing). One end of each of the two terminal portion bodies 223 protrudes out of the housing portion 9 and is electrically connected to the terminal 208 (see FIG. 5). From the other end of each of the two terminal portion bodies 223, the first terminal part 221 and the second terminal part 222 protrude. That is to say, the second terminal part 222 is electrically connected to the first terminal part 221 via the terminal portion body 223. The first separable portion 211 is connected between the two first terminal parts 221 protruding from the respective terminal portion bodies 223. The second separable portion 212 is connected between the two second terminal parts 222 protruding from the respective terminal portion bodies 223. When the actuator pin 8 cuts off the first separable portion 211 from the two first terminal parts 221 and also cuts off the second separable portion 212 from the two second terminal parts 222, the external electric circuit EC10 (see FIG. 5) is interrupted.

Each of the first separable portion 211 and the second separable portion 212 forms part of an electric circuit. More specifically, each of the first separable portion 211 and the second separable portion 212 is directly connected to the two terminal portions 22D. The first separable portion 211 is connected to the two terminal portion bodies 223 via the two first terminal parts 221. The second separable portion 212 is connected to the two terminal portion bodies 223 via the two second terminal parts 222.

The first separable portion 211 and the second separable portion 212 are electrically connected in parallel. More specifically, a first series electric circuit (electrically conductive plate) including the two first terminal parts 221 and the first separable portion 211 provided between the two first terminal parts 221 and a second series electric circuit (electrically conductive plate) including the two second terminal parts 222 and the second separable portion 212 provided between the two second terminal parts 222 are electrically connected in parallel between the two terminal portion bodies 223.

In the electrical conductor 2D, an insert hole 213 is provided between the first series electric circuit and the second series electric circuit (i.e., between the first separable portion 211 and the second separable portion 212).

A protruding member 82D of the actuator pin 8 includes an insert portion 87 and two pressing portions 88. The insert portion 87 protrudes from the base 81 of the actuator pin 8. The insert portion 87 has a rectangular parallelepiped shape. The insert portion 87 is inserted into the insert hole 213 of the electrical conductor 2D. This allows the actuator pin 8 to be positioned in a direction perpendicular to the direction in which the insert portion 87 protrudes from the base 81.

The two pressing portions 88 protrude from the insert portion 87. The direction in which the two pressing portions 88 protrude intersects with the direction in which the insert portion 87 protrudes from the base 81. The two pressing portions 88 protrude in mutually opposite directions. The two pressing portions 88 are provided one to one for their associated two separable portions 21D. Thus, when measured in the direction in which the actuator pin 8D advances before the first separable portion 211 and the second separable portion 212 are cut off from the two terminal portions 22D, the distance between the first separable portion 211 and the actuator pin 8D facing the first separable portion 211 is equal to the distance between the second separable portion 212 and the actuator pin 8D facing the second separable portion 212. Specifically, the distance between the first separable portion 211 and the actuator pin 8D facing the first separable portion 211 and the distance between the second separable portion 212 and the actuator pin 8D facing the second separable portion 212 are both equal to zero. In FIG. 10, however, the actuator pin 8D is illustrated as being separate from the first separable portion 211 and the second separable portion 212 for the sake of convenience.

As used herein, if a plurality of values, each representing a length or a distance, are described as being "equal to" each other, the phrase does not always mean that these values are exactly equal to each other. Rather, if a plurality of values are described as being "equal to" each other, then this phrase herein means that any one of the plurality of values may be 90% to 110% of another one of the plurality of values, for example.

One of the two pressing portions 88 of the actuator pin 8D presses the first separable portion 211, thus cutting off the first separable portion 211 from the two first terminal parts 221 (terminal portions 22D). The other of the two pressing portions 88 presses the second separable portion 212, thus cutting off the second separable portion 212 from the two second terminal parts 222 (terminal portions 22D).

When the actuator pin 8D is driven under the pressure of the gas produced by the gas producer 7 (see FIG. 3), each pressing portion 88 presses its associated separable portion 21D. More specifically, the respective pressing portions 88 press their associated separable portions 21D simultaneously. In other words, the timing when one of the two pressing portions 88 of the actuator pin 8D presses the first separable portion 211 is the same as the timing when the other of the two pressing portions 88 presses the second separable portion 212. As the respective pressing portions 88 press their associated separable portions 21D, the respective separable portions 21D start to be cut off from the two terminal portions 22D simultaneously. Then, the respective separable portions 21D will be completely cut off from the two terminal portions 22D. The respective separable portions 21D will be cut off from the terminal portions 22D at the same timing.

In this embodiment, the electrical conductor 2D may include three or more separable portions 21D. Optionally, the interrupter 1D may include, instead of the actuator pin 8D, the same number of actuator pins 8, each having the same configuration as its counterpart of the first embodiment (see FIG. 3), as the separable portions 21D provided. In addition, the interrupter 1D may include the same number of gas producers 7 (see FIG. 3) as the separable portions 21D provided. The plurality of separable portions 21D are associated one to one with the plurality of actuator pins 8. The plurality of actuator pins 8 are associated one to one with the plurality of gas producers 7. Each gas producer 7 may be configured to drive an associated one of the actuator pins 8 and each actuator pin 8 may be configured to press an associated one of the separable portions 21D. This allows, even when the electrical conductor 2D has a greater thickness and a greater width, the respective separable portions 21D to be cut off from the two terminal portions 22D.

Figure 18:
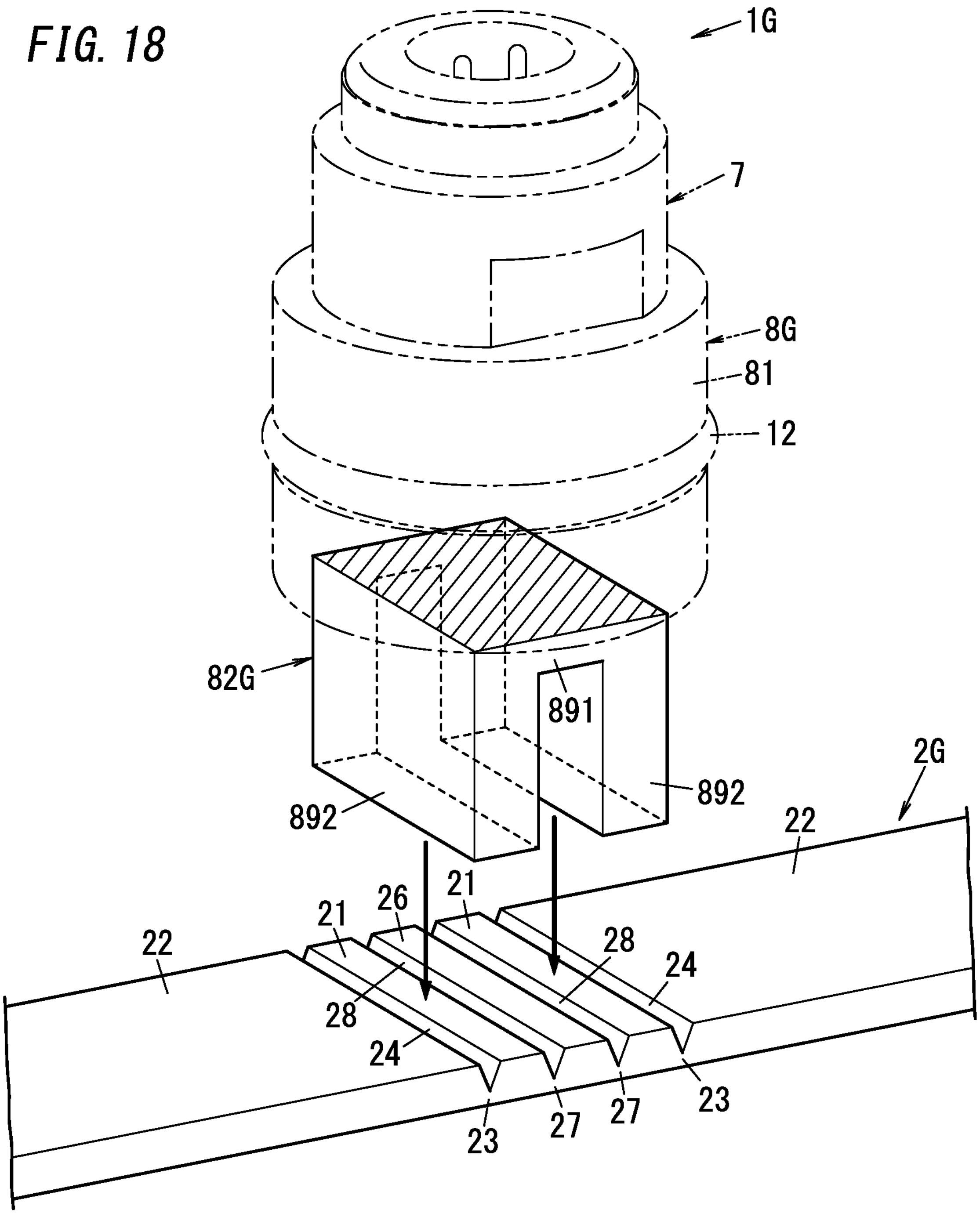
FIG. 18 is a perspective view of a principal part of an interrupter according to a seventh embodiment.

Optionally, the first separable portion 211 and the second separable portion 212 may be electrically connected in series (see the seventh embodiment and FIG. 18).

Alternatively, a single part may be used as both the first terminal part 221 and the second terminal part 222.

The housing space 98 (see FIG. 2) of the housing portion 9 (see FIG. 2) may house at least one of the first and second separable portions 211, 212 cut off from the two terminal portions 22D.

Resume of Fifth Embodiment

The fifth embodiment described above may be a specific implementation of the following aspects of the present disclosure.

In the interrupter 1D according to the fifth embodiment, the electrical conductor 2D includes a plurality of separable portions 21D. Two out of the plurality of separable portions 21D serve as a first separable portion 211 and a second separable portion 212, respectively. The first separable portion 211 and the second separable portion 212 are electrically connected in either series or parallel. The actuator pin 8D cuts off the first separable portion 211 from the terminal portion 22D by pressing the first separable portion 211 and also cuts off the second separable portion 212 from the terminal portion 22D by pressing the second separable portion 212. Before the plurality of the separable portions 21D are cut off from the terminal portion 22D, a distance between the first separable portion 211 and the actuator pin 8D facing the first separable portion 211 is equal to a distance between the second separable portion 212 and the actuator pin 8D facing the second separable portion 212 when measured in a direction in which the actuator pin 8D advances.

According to this configuration, if the first separable portion 211 and the second separable portion 212 are electrically connected in parallel, then an electric current on the electric circuit EC1 will flow separately through the plurality of separable portions 21D. This reduces the amount of electric current flowing through each separable portion 21D, thus facilitating cutting off the arc. On the other hand, if the first separable portion 211 and the second separable portion 212 are electrically connected in series, then the arc voltage generated between the first separable portion 211 and the second separable portion 212 will be divided and distributed in the first separable portion 211 and the second separable portion 212. This causes an increase in arc voltage, thus allowing the interrupter 1D to have improved arc quenching capability.

In the interrupter 1D according to the fifth embodiment, the electrical conductor 2D includes a plurality of separable portions 21D. Two out of the plurality of separable portions 21D serve as a first separable portion 211 and a second separable portion 212, respectively. The first separable portion 211 and the second separable portion 212 are electrically connected in either series or parallel. The actuator pin 8D cuts off the first separable portion 211 from each terminal portion 22D by pressing the first separable portion 211 and also cuts off the second separable portion 212 from the terminal portion 22D by pressing the second separable portion 212. A timing when the actuator pin 8D presses the first separable portion 211 is the same as a timing when the actuator pin 8D presses the second separable portion 212.

According to this configuration, if the first separable portion 211 and the second separable portion 212 are electrically connected in parallel, then an electric current on the electric circuit EC1 will flow separately through the plurality of separable portions 21D. This reduces the amount of electric current flowing through each separable portion 21D, thus facilitating cutting off the arc. On the other hand, if the first separable portion 211 and the second separable portion 212 are electrically connected in series, then the arc voltage generated between the first separable portion 211 and the second separable portion 212 will be divided and distributed in the first separable portion 211 and the second separable portion 212. This causes an increase in arc voltage, thus allowing the interrupter 1D to have improved arc quenching capability.

Sixth Embodiment

An interrupter 1E according to a sixth embodiment will now be described with reference to FIG. 11. In the following description, any constituent element of this sixth embodiment, having the same function as a counterpart of the first embodiment described above, will be designated by the same reference numeral as that counterpart's, and description thereof will be omitted herein.

In the interrupter 1E, the electrical conductor 2E includes a first member 3 and a second member 4. The first member 3 includes a first separable portion 31 and two first terminal portions 32. The second member 4 includes a second separable portion 41 and two second terminal portions 42. That is to say, the electrical conductor 2E includes a plurality of (e.g., two in the example illustrated in FIG. 11) separable portions. In addition, the electrical conductor 2E includes a plurality of (e.g., four in the example illustrated in FIG. 11) terminal portions.

Figure 5:
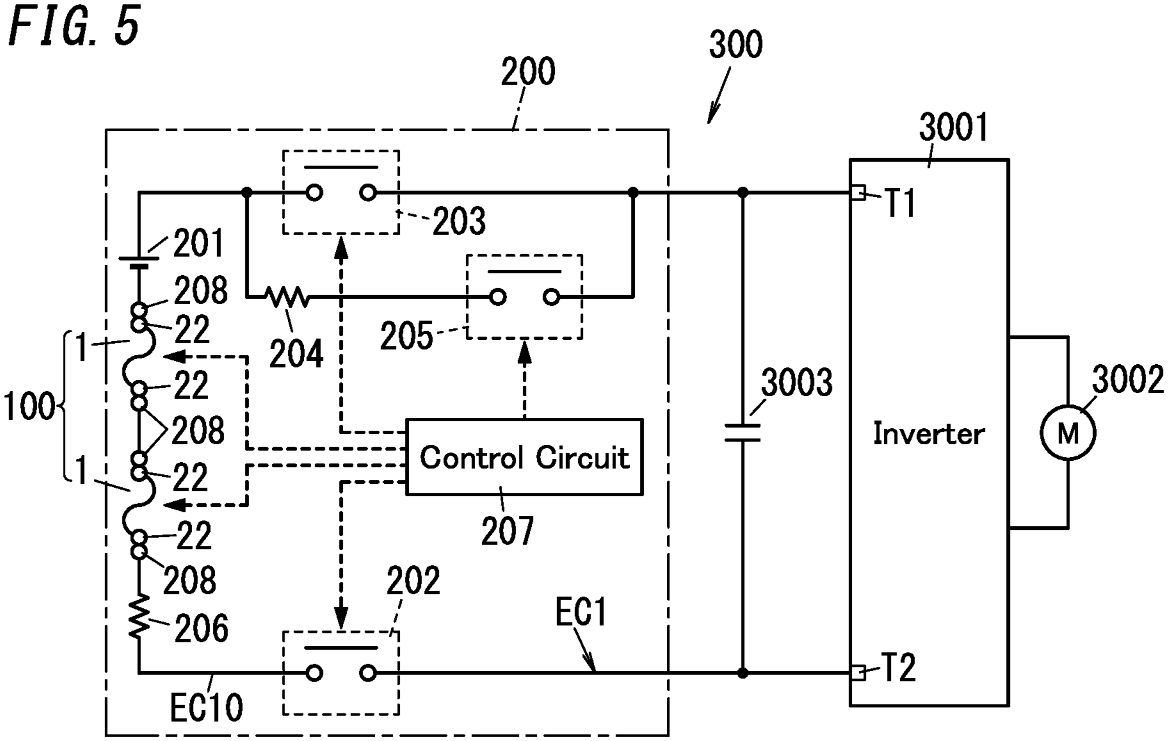
FIG. 5 is a circuit diagram of a circuit with an interrupter system including a plurality of the interrupters.

The interrupter 1E is electrically connected to the two terminals 208 (see FIG. 5) of the external electric circuit EC10 (see FIG. 5). That is to say, the two first terminal portions 32 are associated one to one with the two terminals 208 and electrically connected to their associated terminals 208, respectively. Likewise, the two second terminal portions 42 are associated one to one with the two terminals 208 and electrically connected to their associated terminals 208, respectively. The second member 4 is electrically connected to the first member 3 in parallel between the two terminals 208.

The first separable portion 31 is connected to the two first terminal portions 32. The second separable portion 41 is connected to the two second terminal portions 42. The second separable portion 41 is electrically connected to the first separable portion 31 in parallel. More specifically, each pair of first and second terminal portions 32, 42 adjacent to each other are electrically connected to each other by coming into contact with each other. Furthermore, in this embodiment, the first separable portion 31 and second separable portion 41 adjacent to each other are electrically connected to each other by coming into contact with each other. That is to say, a state where the first separable portion 31 and the second separable portion 41 are electrically connected in parallel may refer to such an arrangement in which the first separable portion 31 and the second separable portion 41 are arranged side by side and in contact with each other.

The two first terminal portions 32 are formed integrally with the first separable portion 31. The two second terminal portions 42 are formed integrally with the second separable portion 41. Each of the first member 3 and the second member 4 has the same shape as the electrical conductor 2 (see FIG. 2) according to the first embodiment. Specifically, in the first member 3, grooves 34 are provided on the two boundary portions 33 between the first separable portion 31 and the two first terminal portions 32. In the second member 4, grooves 44 are provided on the two boundary portions 43 between the second separable portion 41 and the two second terminal portions 42.

The first separable portion 31 is cut off from the two first terminal portions 32 by the actuator pin 8 that has been driven under the pressure of the gas produced by the gas producer 7 (see FIG. 3). The second separable portion 41 is cut off from the two second terminal portions 42 by the actuator pin 8 that has been driven under the pressure of the gas produced by the gas producer 7.

Specifically, as the actuator pin 8 is driven under the pressure of the gas produced by the gas producer 7, the first separable portion 31 is pressed by the actuator pin 8 and thereby cut off from the two first terminal portions 32. Thereafter, the second separable portion 41 is pressed by the actuator pin 8 that has further advanced and thereby cut off from the two second terminal portions 42. In the following description, the timing when the first separable portion 31 starts to be cut off from the two first terminal portions 32 will be hereinafter referred to as a "first timing," and the timing when the second separable portion 41 starts to be cut off from the two second terminal portions 42 will be hereinafter referred to as a "second timing."

At a point in time prior to the first timing, the first separable portion 31 and the second separable portion 41 are arranged side by side in the direction in which the actuator pin 8 advances. In addition, before the actuator pin 8 is driven, the first separable portion 31 and the second separable portion 41 are arranged side by side in a first direction. The first direction is the direction in which the actuator pin 8 advances (i.e., downward direction on the paper on which FIG. 11 is drawn).

The first member 3 and the second member 4 are connected together on their respective surfaces opposite from the surfaces with the grooves 34, 44. More specifically, the first member 3 and the second member 4 are connected together by brazing, for example. That is to say, at a point in time prior to the first timing, the first separable portion 31 is bonded by brazing to the second separable portion 41.

Each of the first separable portion 31 and second separable portion 41 forms part of an electric circuit. More specifically, the first separable portion 31 is directly connected to the two first terminal portions 32. The second separable portion 41 is directly connected to the two second terminal portions 42.

The first separable portion 31 and the two first terminal portions 32 may be made of copper, for example. The second separable portion 41 and the two second terminal portions 42 may be made of tungsten, for example. The electrical conductivity of the first separable portion 31 is higher than the electrical conductivity of the second separable portion 41. At a point in time prior to the first timing, the electrical resistance of the first separable portion 31 as measured in a direction in which an electric current flows through the first separable portion 31 is smaller than the electrical resistance of the second separable portion 41 as measured in a direction in which an electric current flows through the second separable portion 41. In other words, when measured in a second direction, the electrical resistance of the first separable portion 31 is smaller than the electrical resistance of the second separable portion 41. As used herein, the second direction is a direction perpendicular to the first direction and aligned with the direction in which the first separable portion 31 and the second separable portion 41 are extended (i.e., rightward/leftward direction on the paper on which FIG. 11 is drawn). The direction in which an electric current (i.e., an electric current flowing between the two first terminal portions 32) flows through the first separable portion 31 and the direction in which an electric current (i.e., an electric current flowing between the two second terminal portions 42) flows through the second separable portion 41 are both aligned with the rightward/leftward direction on the paper on which FIG. 11 is drawn. The melting point of the second separable portion 41 is higher than the melting point of the first separable portion 31.

A point in time when no gas is produced yet by the gas producer 7 (see FIG. 3) is a point in time before the first separable portion 31 is cut off from the two first terminal portions 32 and before the second separable portion 41 is cut off from the two second terminal portions 42. At this point in time, when measured in the direction in which the actuator pin 8 advances, the distance between the first separable portion 31 and the actuator pin 8 is shorter than the distance between the second separable portion 41 and the actuator pin 8. More specifically, the tip 86 of the protruding member 82 of the actuator pin 8 is in contact with the first separable portion 31. That is to say, when measured in the direction in which the actuator pin 8 advances, the distance between the first separable portion 31 and the actuator pin 8 is zero. The first separable portion 31 is located between the second separable portion 41 and the protruding member 82.

Figure 11:
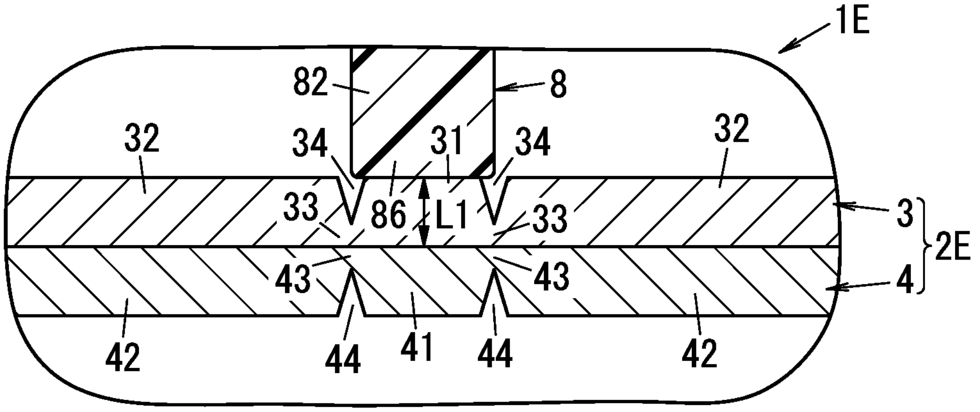
FIG. 11 is a cross-sectional view of a principal part of an interrupter according to a sixth embodiment.

The actuator pin 8 is movable in the first direction (i.e., downward direction on the paper on which FIG. 11 is drawn). The first separable portion 31 and the second separable portion 41 are extended in the second direction (i.e., rightward/leftward direction on the paper on which FIG. 11 is drawn) perpendicular to the first direction. An electric current flows in the second direction through the first separable portion 31 and the second separable portion 41. In the following description, a direction perpendicular to both the first direction and the second direction will be hereinafter referred to as a “third direction” (a direction aligned with a normal to the paper on which FIG. 11 is drawn). Before the actuator pin 8 is driven, the distance L1 as measured in the first direction between the actuator pin 8 and the second separable portion 41 is longer, when viewed in the third direction, than the distance (of zero) as measured in the first direction between the actuator pin 8 and the first separable portion 31.

The timing when the actuator pin 8 presses the first separable portion 31 is earlier than the timing when the actuator pin 8 presses the second separable portion 41. Thus, a first timing when the first separable portion 31 starts to be cut off from the two first terminal portions 32 by the actuator pin 8 is earlier than a second timing when the second separable portion 41 starts to be cut off from the two second terminal portions 42 by the actuator pin 8.

When the actuator pin 8 is driven under the pressure of the gas produced by the gas producer 7 (see FIG. 3), the first separable portion 31 is pressed by the actuator pin 8 and thereby cut off from the two first terminal portions 32. Meanwhile, at this point in time, the second separable portion 41 may still be not cut off from the two second terminal portions 42 yet. In that case, an electric current continues to flow through the electric circuit along a path passing through the second separable portion 41 and the two second terminal portions 42. Thus, when the first separable portion 31 is cut off from the two first terminal portions 32, an arc is not generated easily. This may reduce generation of an arc compared to an interrupter that does not include the second member 4. As used herein, “to reduce generation of an arc” refers to not only preventing an arc from being generated but also shortening the duration of the arc generated or cutting down the energy of the arc generated as well.

Thereafter, the second separable portion 41 is pressed by the actuator pin 8 and thereby cut off from the two second terminal portions 42. At this point in time, an arc may be generated between the second separable portion 41 and the two second terminal portions 42. The melting point of the second separable portion 41 is higher than the melting point of the first separable portion 31. Thus, a metallic vapor is produced less easily from the second separable portion 41 than from the first separable portion 31. That is why the arc generated between the second separable portion 41 and the two second terminal portions 42 may be cut off more easily than the arc generated between the first separable portion 31 and the two first terminal portions 32.

In addition, the electrical conductivity of the first separable portion 31 is higher than the electrical conductivity of the second separable portion 41. Thus, before the actuator pin 8 is driven, the electrical conductor 2E may be electrified more smoothly compared to a situation where the electrical conductor 2E includes the second separable portion 41 but does not include the first separable portion 31.

Furthermore, the electrical resistance of the first separable portion 31 is smaller than the electrical resistance of the second separable portion 41. This may reduce generation of an arc from the electrical conductor 2E before the actuator pin 8 is driven, compared to a situation where the electrical conductor 2E does not include the second separable portion 41.

This allows the interrupter 1E according to this embodiment to have improved arc quenching capability while maintaining electrification capability, compared to the interrupter 1 according to the first embodiment.

In this embodiment, the first member 3 and the second member 4 do not have to be bonded together by brazing but may also be bonded together by welding, screwing, snap-fitting, or any other suitable means.

In addition, in this embodiment, the first member 3 and the second member 4 do not have to be connected (bonded) together by brazing or any other suitable means but the second member 4 may be just put on the first member 3. Alternatively, the first member 3 may be just put on the second member 4. That is to say, at a point in time prior to the first timing, the first separable portion 31 may be connected to, or in contact with, the second separable portion 41.

Also, the first separable portion 31 does not have to be cut off from both of the two first terminal portions 32 but may be cut off from at least one of the two first terminal portions 32. The first timing may be a timing when the first separable portion 31 starts to be cut off from at least one of the two first terminal portions 32. Likewise, the second separable portion 41 does not have to be cut off from both of the two second terminal portions 42 but may be cut off from at least one of the two second terminal portions 42. The second timing may be a timing when the second separable portion 41 starts to be cut off from at least one of the two second terminal portions 42.

Furthermore, out of the first separable portion 31 and the second separable portion 41, at least the first separable portion 31 needs to be cut off from at least one of the two first terminal portions 32. Meanwhile, the second separable portion 41 does not have to be cut off from at least one of the two second terminal portions 42. That is to say, the actuator pin 8 driven under the pressure of the gas produced by the gas producer 7 needs to cut off at least the first separable portion 31 from the terminal portions, out of the first separable portion 31 and the second separable portion 41.

Optionally, at least one of the first member 3 or the second member 4 may be provided with a single or a plurality of holes instead of the grooves 34 (or 44). Also, at least one of the first separable portion 31 or the second separable portion 41 may include a portion, of which the thickness and/or width is/are smaller than that of a surrounding member thereof, instead of the grooves 34 (or 44).

First Variation of Sixth Embodiment

An interrupter 1F according to a first variation of the sixth embodiment will now be described with reference to FIGS. 12-16. In the following description, any constituent element of this first variation, having the same function as a counterpart of the sixth embodiment described above, will be designated by the same reference numeral as that counterpart's, and description thereof will be omitted herein.

In this first variation, the first separable portion 31 and second separable portion 41 of the electrical conductor 2F are out of contact with each other in the direction in which the actuator pin 8 advances. That is to say, at a point in time prior to the first timing when the first separable portion 31 starts to be cut off from the two first terminal portions 32, the first separable portion 31 and the second separable portion 41 are arranged side by side and spaced apart from each other in the direction in which the actuator pin 8 advances. In addition, before the actuator pin 8 is driven, the first separable portion 31 and the second separable portion 41 are arranged side by side and spaced apart from each other in a first direction. As used herein, the first direction refers to the direction in which the actuator pin 8 advances (i.e., the downward direction on the paper on which FIG. 12 is drawn).

The first separable portion 31 is connected to the two first terminal portions 32. The second separable portion 41 is connected to the two second terminal portions 42. The second separable portion 41 is electrically connected to the first separable portion 31 in parallel via two second terminal portions 42F.

The second member 4 includes the two second terminal portions 42F instead of the two second terminal portions 42 (see FIG. 11). Each of the two second terminal portions 42 is bent. Each of the two second terminal portions 42F is connected to the second separable portion 41 and forms part of an electric circuit.

Figure 12:
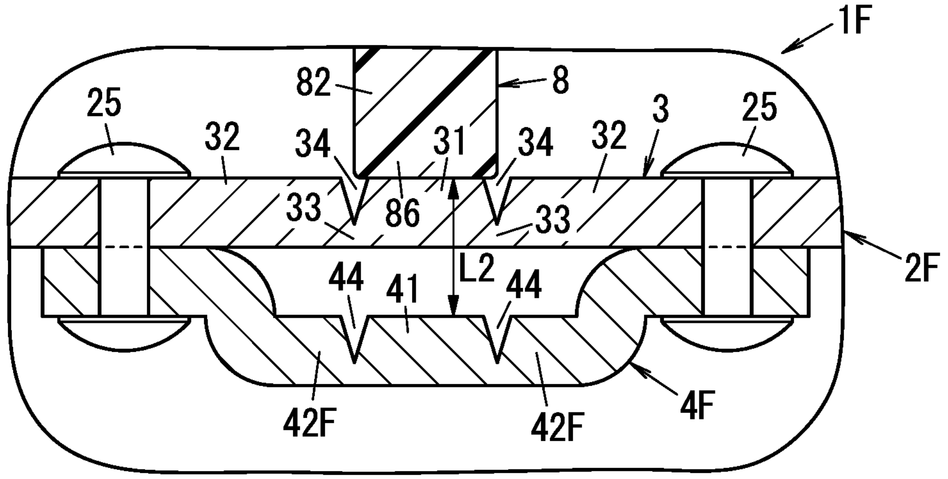
FIG. 12 is a cross-sectional view of a principal part of an interrupter according to a first variation of the sixth embodiment.
Figure 13:
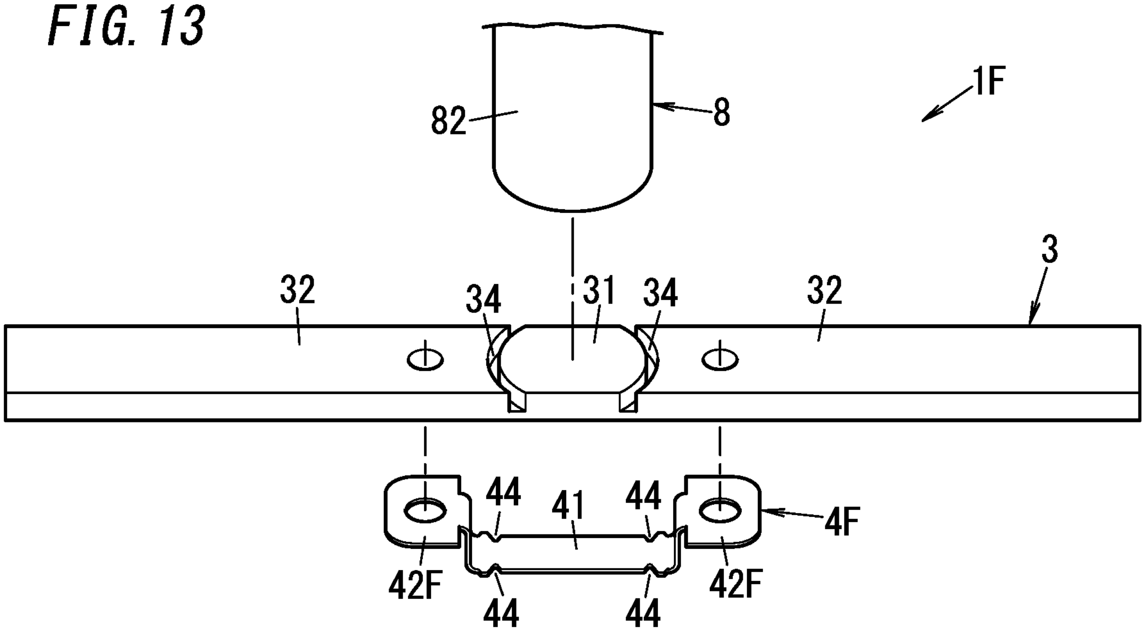
FIG. 13 is an exploded perspective view of the principal part of the interrupter.
Figure 14:
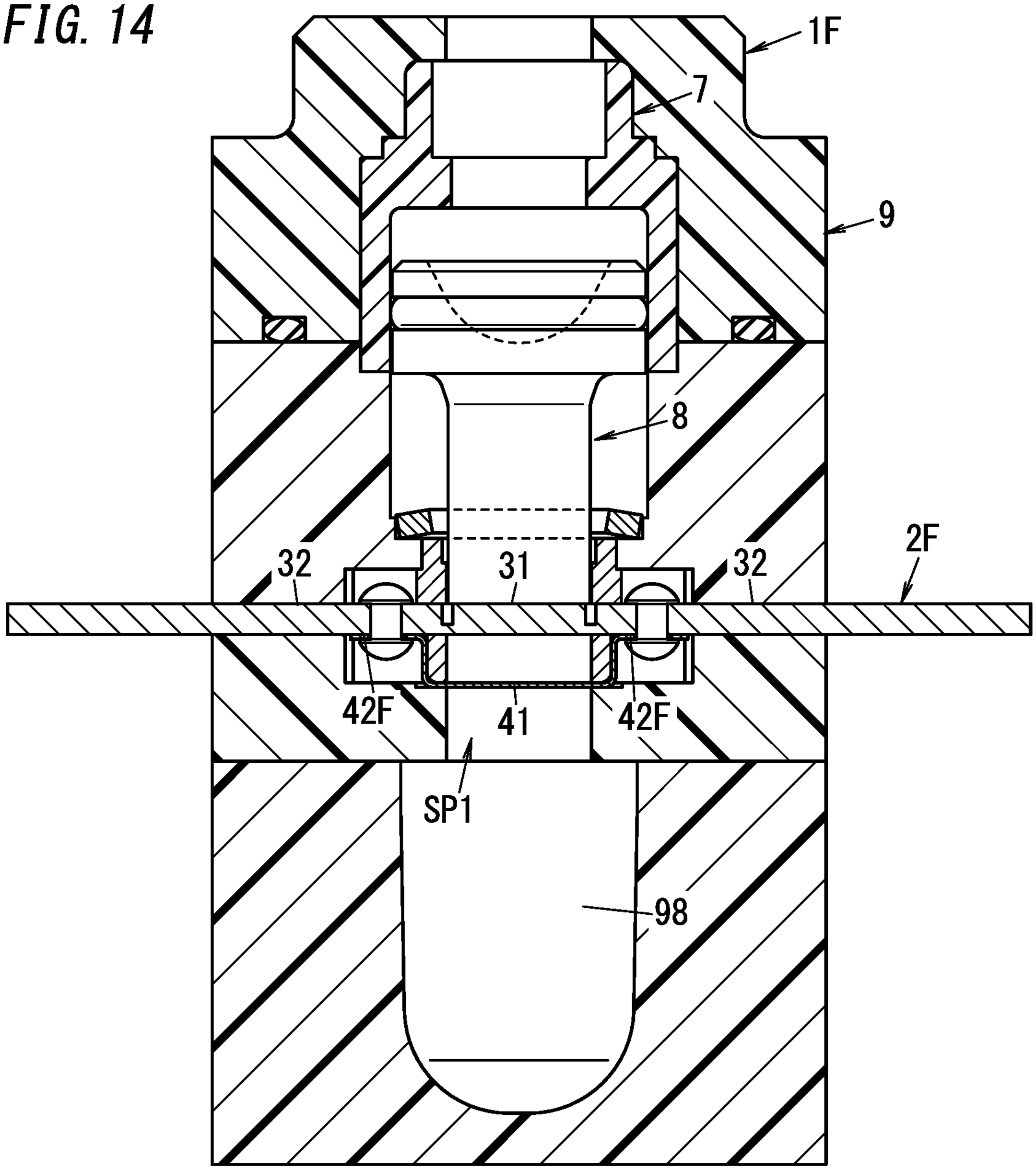
FIG. 14 is a cross-sectional view of the interrupter, illustrating its state before an actuator pin is driven.
Figure 15:
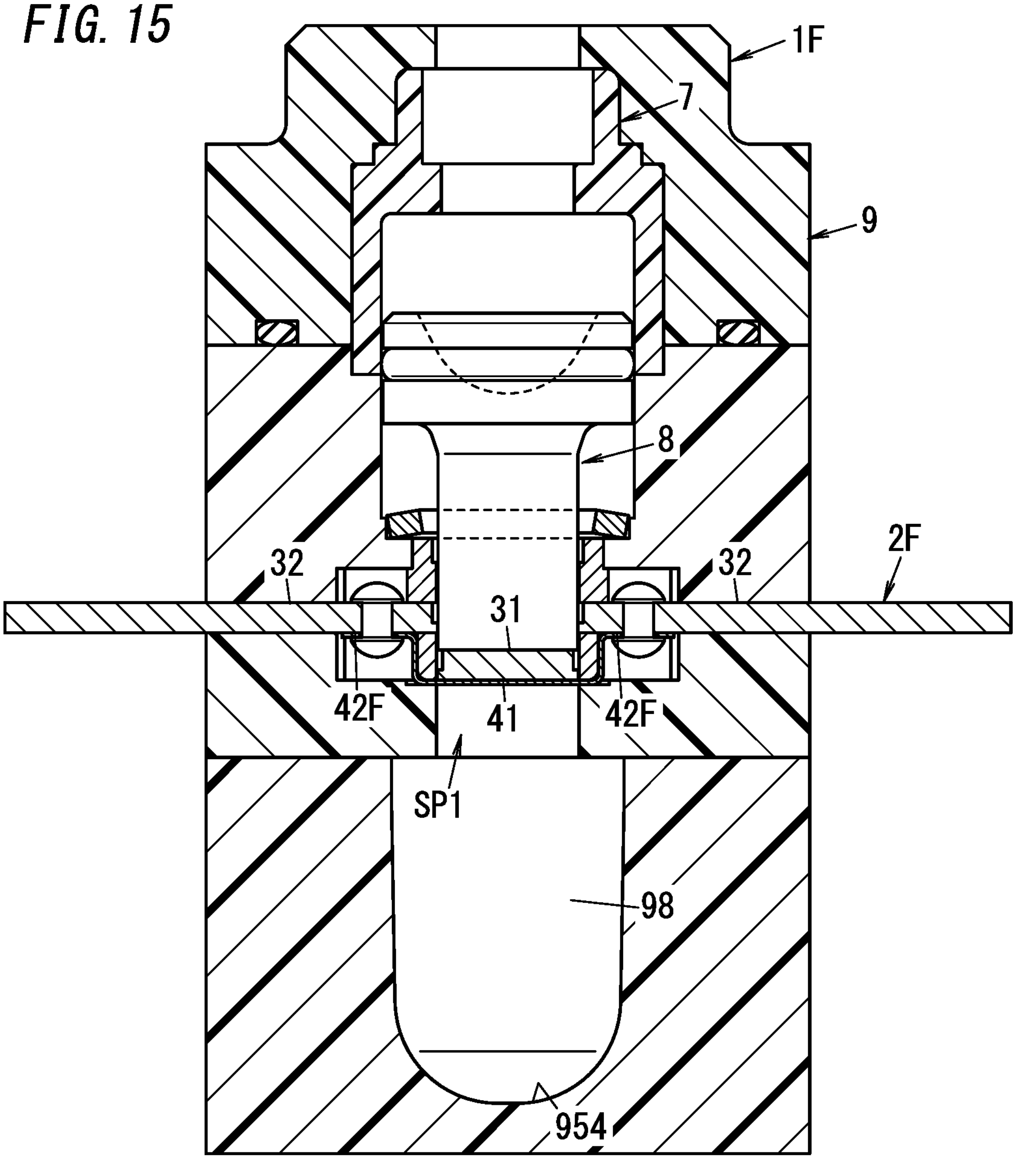
FIG. 15 is a cross-sectional view of the interrupter, illustrating its state after the actuator pin has been driven and a first separable portion has been cut off.

FIG. 12 illustrate an exemplary configuration for the second member 4F. FIGS. 13-16 illustrate another exemplary configuration for the second member 4F. In FIGS. 13-16, the second member 4F is less than the first member 3. In FIG. 12, the second member 4F has two grooves 44 provided between the second separable portion 41 and two second terminal portions 42F of the second member 4F. The two grooves 44 are formed to be recessed in the direction in which the actuator pin 8 advances. Meanwhile, in FIGS. 13-16, the second member 4F has four grooves 44, which make the second member 4F recessed from both ends of the width (i.e., along a normal to the paper on which FIG. 14 is drawn) of the first member 3. In addition, in FIGS. 13-16, an arc-shaped groove 34 is provided between the first separable portion 31 and each first terminal portion 32 of the first member 3. In the other respects, the interrupter 1F shown in FIG. 12 has the same configuration as the interrupter 1F shown in FIGS. 13-16.

Before both the first separable portion 31 and second separable portion 41 are cut off from the two first terminal portions 32 and the two second terminal portions 42, respectively (see FIGS. 12 and 14), when measured in the direction in which the actuator pin 8 advances, the distance between the first separable portion 31 and the actuator pin 8 is shorter than the distance between the second separable portion 41 and the actuator pin 8. When measured in the direction in which the actuator pin 8 advances, the distance between the first separable portion 31 and the actuator pin 8 is zero. One of the two second terminal portions 42F of the second member 4F is connected to one of the two first terminal portions 32 of the first member 3. The other of the two second terminal portions 42F is connected to the other of the two first terminal portions 32 of the first member 3. More specifically, the interrupter 1F further includes two rivets 25. Each of the two second terminal portions 42F is connected to an associated first terminal portion 32 via an associated one of the rivets 25. In this manner, the second terminal portions 42F are fixed to the first terminal portions 32 at one and the other ends of the second member 4F. Specifically, at one end of the second member 4F, one of the two second terminal portions 42F is fixed to one of the two first terminal portions 32. At the other end of the second member 4F, the other of the two second terminal portions 42F is fixed to the other of the two first terminal portions 32.

Each of the two second terminal portions 42F is bent in a crank shape between the rivet 25 and the second separable portion 41. Thus, the second separable portion 41 is out of contact with the first separable portion 31 in the direction in which the actuator pin 8 advances. The timing when the actuator pin 8 presses the first separable portion 31 is earlier than the timing when the actuator pin 8 presses the second separable portion 41. Thus, when the first separable portion

31 is cut off from the two first terminal portions 32 by the actuator pin 8 (see FIG. 15), the second separable portion 41 is still not cut off yet from the two second terminal portions 42. Thereafter, when the actuator pin 8 further advances, the second separable portion 41 will be cut off from the two second terminal portions 42 by the actuator pin 8 (see FIG. 16).

That is to say, the timing when the first separable portion 31 starts to be cut off by the actuator pin 8 is earlier than the timing when the second separable portion 41 starts to be cut off by the actuator pin 8.

Figure 16:
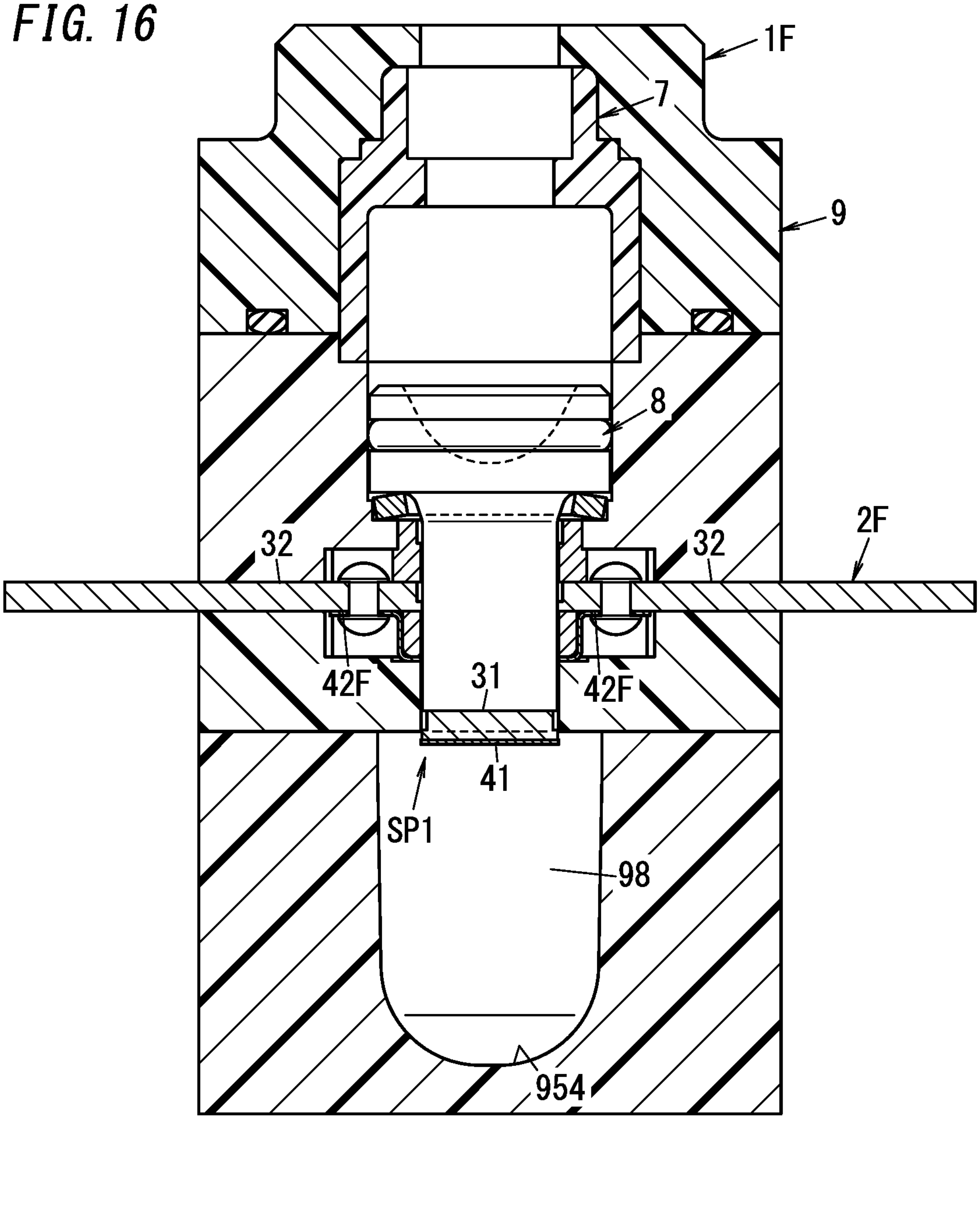
FIG. 16 is a cross-sectional view of the interrupter, illustrating its state after the actuator pin has been driven and first and second separable portions have been cut off.

Also, when the actuator pin 8 reaches its end point, a gap may be left as shown in FIG. 16 in the housing space 98 in the direction in which the actuator pin 8 advances.

As can be seen from the foregoing description, according to this first variation, the second separable portion 41 is out of contact with the first separable portion 31 in the direction in which the actuator pin 8 advances. This reduces the chances of the arc generated between the second separable portion 41 and the two second terminal portions 42F moving to between the first separable portion 31 and the two first terminal portions 32. This further reduces the generation of the arc from the first separable portion 31 after the first separable portion 31 has been cut off from the two first terminal portions 32.

In addition, if only the first member 3 is broken, out of the first member 3 and the second member 4, then the electrical resistance of the electrical conductor 2F increases from its value before the first separable portion 31 is broken. This reduces the amount of electric current flowing through the electrical conductor 2*f*, thus reducing the generation of the arc.

Furthermore, in the interrupter 1F, at a point in time prior to the first timing, the electrical resistance of the first separable portion 31 as measured in the direction in which an electric current flows through the first separable portion 31 is suitably smaller than the electrical resistance of the second separable portion 41 as measured in the direction in which an electric current flows through the second separable portion 41. This further reduces the generation of the arc from the electrical conductor 2F.

Second Variation of Sixth Embodiment

An interrupter 1M according to a second variation of the sixth embodiment will now be described with reference to FIG. 17. The interrupter 1M according to this second variation is implemented to have, in combination, the features of the interrupter 1D according to the fifth embodiment and the features of the interrupter 1F according to the first variation of the sixth embodiment. In the following description, any constituent element of this second variation, having the same function as a counterpart of the fifth embodiment described above, will be designated by the same reference numeral as that counterpart's, and description thereof will be omitted herein.

Figure 17:
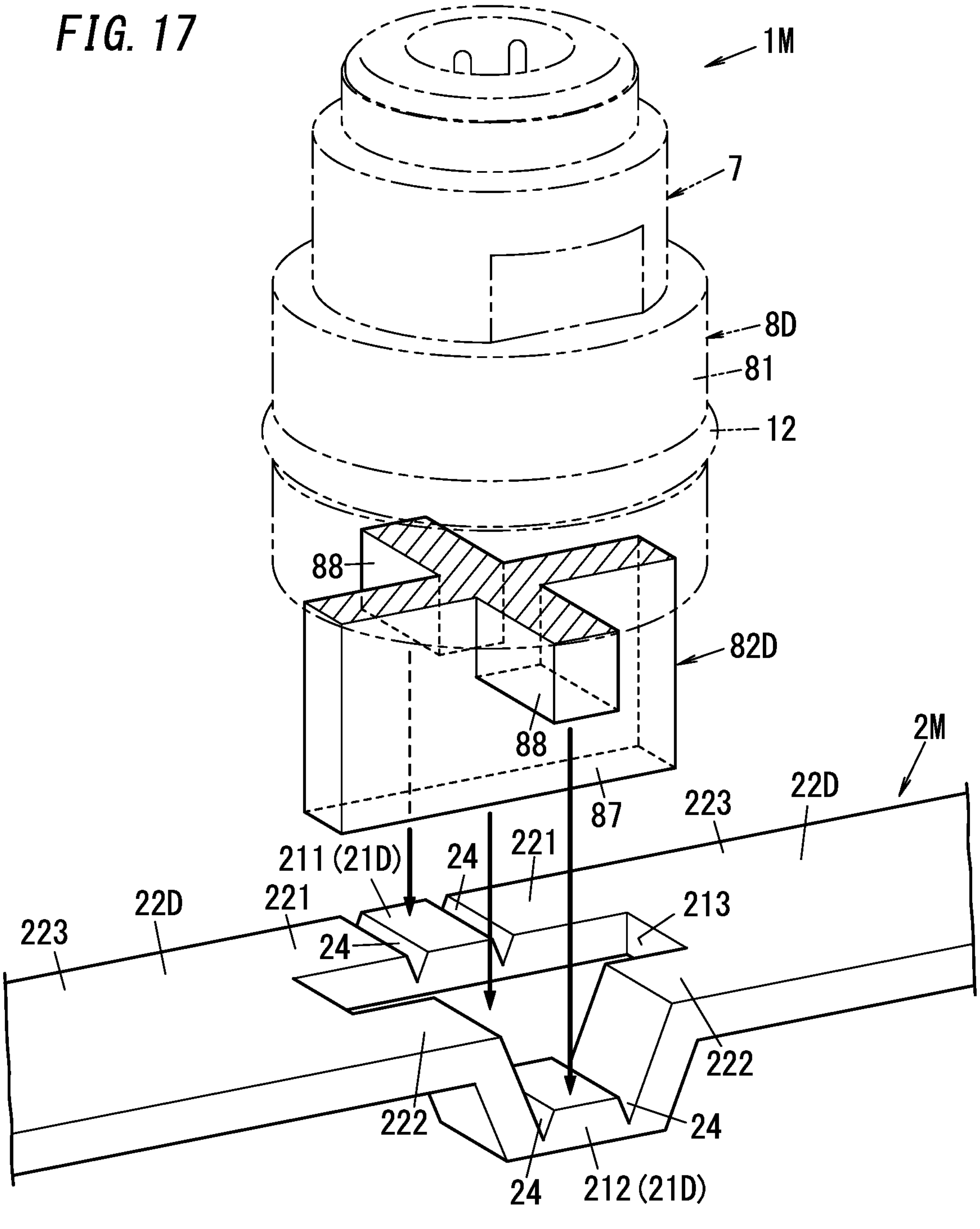
FIG. 17 is a perspective view of a principal part of an interrupter according to a second variation of the sixth embodiment.

FIG. 17 illustrates a state before the actuator pin 8 is driven. At this point in time, the first separable portion 211 and the second separable portion 212 are located at mutually different positions not only in the direction in which the actuator pin 8D advances but also in a direction intersecting with the in the direction in which the actuator pin 8D advances and the longitudinal axis of the electrical conductor 2M. More specifically, the two second terminal parts 222 according to this second variation are bent unlike the two second terminal parts 222 according to the fifth embodiment, thus making the second separable portion 212 located deeper in the direction in which the actuator pin 8D advances than the first separable portion 211 is.

That is to say, as in the sixth embodiment described above, before the actuator pin 8D is driven, the distance as measured in the first direction between the actuator pin 8D and the second separable portion 212 is longer when viewed in the third direction than the distance as measured in the first direction between the actuator pin 8D and the first separable portion 211. As used herein, the first direction is a direction in which the actuator pin 8D moves. The third direction is perpendicular to both the first direction and the second direction (i.e., a direction perpendicular to the first direction and aligned with a direction in which the first separable portion 211 and the second separable portion 212 are extended).

When the actuator pin 8D is driven under the pressure of the gas produced by the gas producer 7, one of the two pressing portions 88 of the actuator pin 8D presses the first separable portion 211, thus cutting off the first separable portion 211 from the two first terminal parts 221. As the actuator pin 8D further advances, the other of the two pressing portions 88 presses the second separable portion 212, thus cutting off the second separable portion 212 from the two second terminal parts 222. That is to say, according to this second variation, the first timing when the first separable portion 211 starts to be cut off from the two first terminal parts 221 is earlier than the second timing when the second separable portion 212 starts to be cut off from the two second terminal parts 222.

This second variation allows the thickness of the electrical conductor 2M to be reduced compared to the first variation of the sixth embodiment.

Also, the electrical conductor 2M may be manufactured by subjecting a single plate member with electrical conductivity to pressing. Specifically, the insert hole 213 is opened by subjecting a single plate member to press punching and then two second terminal parts 222 are bent by press bending, thereby manufacturing the electrical conductor 2M. This reduces, compared to the electrical conductor 2E according to the sixth embodiment, the number of members as materials for the electrical conductor 2M.

Optionally, in this second variation, the second separable portion 212 may be less thick than the first separable portion 211. In other words, when measured in the first direction, the thickness of the first separable portion 211 may be larger than the thickness of the second separable portion 212. As used herein, the first direction is a direction in which the actuator pin 8D moves. Thus, at a point in time prior to the first timing, the electrical resistance of the first separable portion 211 as measured in a direction in which an electric current flows through the first separable portion 211 may be set at a value smaller than the electrical resistance of the second separable portion 212 as measured in a direction in which an electric current flows through the second separable portion 212. This configuration may further reduce the generation of an arc from the electrical conductor 2M. Optionally, at least one of the two second terminal parts 222 may be less thick than the first separable portion 211. For example, the second separable portion 212 and the two second terminal parts 222 may be compressed along their thickness by press compression to have a smaller thickness than the first separable portion 211.

Optionally, even in the sixth embodiment and the first variation of the sixth embodiment, when measured in the first direction, the thickness of the first separable portion 31 may be larger than the thickness of the second separable portion 41.

Resume of Sixth Embodiment and First and Second Variations of Sixth Embodiment

The sixth embodiment and first and second variations thereof described above may be specific implementations of the following aspects of the present disclosure.

In the interrupter 1E (or 1F, 1M) according to the sixth embodiment and the first and second variations thereof, the first timing when the first separable portion 31 (or 211) starts to be cut off from the first terminal portion 32 (or first terminal part 221) is earlier than the second timing when the second separable portion 41 (or 212) starts to be cut off from the second terminal portion 42 (42F, or second terminal part 222).

This configuration may reduce generation of an arc from the first separable portion 31 (or 211) compared to a situation where the electrical conductor 2E (or 2F, 2M) has only one separable portion.

Also, in the interrupter 1E (or 1F, 1M) according to the sixth embodiment and the first and second variations thereof, the electrical conductor 2E (or 2F, 2M) includes a plurality of separable portions. Two out of the plurality of separable portions serve as a first separable portion 31 (or 211) and a second separable portion 41 (or 212), respectively. The actuator pin 8 cuts off the first separable portion 31 (or 211) from the terminal portion (first terminal portion 32 or first terminal part 221) by pressing the first separable portion 31 (or 211) and also cuts off the second separable portion 41 (or 212) from the terminal portion (second terminal portion 42, 42F, or second terminal part 222) by pressing the second separable portion 41 (or 212). Before the plurality of separable portions are cut off from the terminal portion, a distance between the first separable portion 31 (or 211) and the actuator pin 8 (or 8D) is shorter than a distance L1 (or L2) between the second separable portion 41 (or 212) and the actuator pin 8 (or 8D) when measured in the direction in which the actuator pin 8 (or 8D) advances.

This configuration may reduce generation of an arc from the first separable portion 31 (or 211).

Furthermore, in the interrupter 1E (or 1F, 1M) according to the sixth embodiment and the first and second variations thereof, the electrical conductor 2E (or 2F, 2M) includes a plurality of separable portions. Two out of the plurality of separable portions serve as a first separable portion 31 (or 211) and a second separable portion 41 (or 212), respectively. The actuator pin 8 (or 8D) cuts off the first separable portion 31 (or 211) from the terminal portion (first terminal portion 32 or first terminal part 221) by pressing the first separable portion 31 (or 211) and also cuts off the second separable portion 41 (or 212) from the terminal portion (second terminal portion 42, 42F, or second terminal part 222) by pressing the second separable portion 41 (or 212). The timing when the actuator pin 8 (or 8D) presses the first separable portion 31 (or 211) is earlier than the timing when the actuator pin 8 (or 8D) presses the second separable portion 41 (or 212).

This configuration may reduce generation of an arc from the first separable portion 31 (or 211).

Furthermore, in the interrupter 1E (or 1F) according to the sixth embodiment and the first variation thereof, at a point in time prior to the first timing, the first separable portion 31 and the second separable portion 41 are arranged side by side in the direction in which the actuator pin 8 advances.

This configuration allows the first separable portion 31 and the second separable portion 41 to be easily cut off from the terminal portions (first terminal portion 32 and the second terminal portion 42) by the actuator pin 8.

Furthermore, in the interrupter 1F (or 1M) according to the sixth embodiment and the first and second variations thereof, at the point in time prior to the first timing, the first separable portion 31 (or 211) and the second separable portion 41 (or 212) are arranged side by side and spaced apart from each other in the direction in which the actuator pin 8 (or 8D) advances.

This configuration facilitates causing a time lag between the first timing and the second timing, thus reducing generation of an arc from the first separable portion 31 (or 211) more easily.

Furthermore, in the interrupter 1E according to the sixth embodiment, at the point in time prior to the first timing, the first separable portion 31 is either in contact with, or joined to, the second separable portion 41.

This configuration makes the installation space of the electrical conductor 2D reducible, compared to a situation where the first separable portion 31 and the second separable portion 41 are provided out of contact with each other.

Furthermore, in the interrupter 1E (or 1F, 1M) according to the sixth embodiment and the first and second variations thereof, at a point in time prior to the first timing, the electrical resistance of the first separable portion 31 (or 211) as measured in a direction in which an electric current flows through the first separable portion 31 (or 211) is smaller than the electrical resistance of the second separable portion 41 (or 212) as measured in a direction in which an electric current flows through the second separable portion 41 (or 212).

This configuration may reduce generation of an arc compared to a situation where the electrical conductor 2E (or 2F, 2M) has only one separable portion.

Furthermore, in the interrupter 1E (or 1F) according to the sixth embodiment and the first variation thereof, the electrical conductivity of the first separable portion 31 is higher than the electrical conductivity of the second separable portion 41.

This configuration allows a larger amount of current to flow through the first separable portion 31.

Furthermore, in the interrupter 1E (or 1F) according to the sixth embodiment and the first variation thereof, the melting point of the second separable portion 41 is higher than the melting point of the first separable portion 31.

According to this configuration, when the actuator pin 8 cuts off the first separable portion 31, which is located closer to the actuator pin 8 than the second separable portion 41 is, from the terminal portion (first terminal portion 32), the second separable portion 41 may still be not cut off yet from the terminal portion (second terminal portion 42 or second terminal portion 42F) and a state where the electric circuit EC1 (see FIG. 5) is electrically conductive may be maintained. In that case, an arc may be generated more easily when the second separable portion 41 is cut off from the terminal portion than when the first separable portion 31 is cut off from the terminal portion. In this case, the melting point of the second separable portion 41 is higher than the melting point of the first separable portion 31, thus making the arc quenchable more easily in the second separable portion 41 than in the first separable portion 31. This allows the interrupter 1E (or 1F) to have improved arc quenching capability.

Furthermore, in the interrupter 1E (or 1F, 1M) according to the sixth embodiment and the first and second variations thereof, the actuator pin 8 (or 8D) is movable in a first direction. The first separable portion 31 (or 211) and the second separable portion 41 (or 212) are extended in a second direction. The second direction is perpendicular to the first direction. Before the actuator pin 8 (or 8D) is driven, a distance L1 (or L2) measured in the first direction between the actuator pin 8 (or 8D) and the second separable portion 41 (or 212) is longer, when viewed in a third direction, than a distance measured in the first direction between the actuator pin 8 (or 8D) and the first separable portion 31 (or 211). The third direction is perpendicular to both the first direction and the second direction.

This configuration may reduce generation of an arc from the first separable portion 31 (or 211).

Furthermore, in the interrupter 1E (or 1F) according to the sixth embodiment and the first variation thereof, before the actuator pin 8 is driven, the first separable portion 31 and the second separable portion 41 are arranged side by side in the first direction.

This configuration allows the first separable portion 31 and the second separable portion 41 to be easily cut off from the terminal portions (first terminal portion 32 and second terminal portion 42, 42F) by the actuator pin 8.

Furthermore, in the interrupter 1F according to the first variation of the sixth embodiment, before the actuator pin 8 is driven, the first separable portion 31 and the second separable portion 41 are arranged side by side and spaced apart from each other in the first direction.

This configuration facilitates causing a time lag between the first timing when the first separable portion 31 starts to be cut off from the first terminal portions 32 and the second timing when the second separable portion 41 starts to be cut off from the second terminal portions 42F, thus reducing generation of an arc from the first separable portion 31 more easily.

Furthermore, in the interrupter 1E (or 1F, 1M) according to the sixth embodiment and the first and second variations thereof, the electrical resistance of the first separable portion 31 (or 211) as measured in the second direction is smaller than the electrical resistance of the second separable portion 41 (or 212) as measured in the second direction.

This configuration may further reduce generation of an arc from the first separable portion 31 (or 211).

Furthermore, in the interrupter 1E (or 1F) according to the sixth embodiment and the first variation thereof, the melting point of the second separable portion 41 is higher than the melting point of the first separable portion 31.

This configuration allows the interrupter 1E (or 1F) to have improved arc quenching capability.

Furthermore, in the interrupter 1E (or 1F, 1M) according to the sixth embodiment and the first and second variations thereof, when measured in the first direction, the thickness of the first separable portion 31 (or 211) is greater than the thickness of the second separable portion 41 (or 212).

This configuration may further reduce generation of an arc from the first separable portion 31.

Seventh Embodiment

An interrupter 1G according to a seventh embodiment will now be described with reference to FIG. 18. In the following description, any constituent element of this seventh embodiment, having the same function as a counterpart of the first embodiment described above, will be designated by the same reference numeral as that counterpart's, and description thereof will be omitted herein.

In the interrupter 1G, the electrical conductor 2G has a plurality of (e.g., two in the example illustrated in FIG. 18) separable portions 21. The two separable portions 21 are electrically connected in series. More specifically, the electrical conductor 2G includes the two separable portions 21, two terminal portions 22, and a coupling portion 26. One of the two terminal portions 22, one of the two separable portions 21, the coupling portion 26, the other of the two separable portions 21, and the other of the two terminal portions 22 are connected in this order in series.

The second body 95 has two housing spaces 98 (see FIG. 2). The two housing spaces 98 are associated one to one with the two separable portions 21. The respective separable portions 21 and their associated housing spaces 98 are arranged side by side in the direction in which the actuator pin 8G advances. The coupling portion 26 and the two terminal portions 22 are in contact with the second body 95 (see FIG. 2).

The boundary portion 23 between each terminal portion 22 and an associated one of the separable portions 21 has a groove 24. The boundary portion 27 between each separable portion 21 and the coupling portion 26 has a groove 28.

The protruding member 82G of the actuator pin 8G includes a coupling piece 891 and two pressing pieces 892. The coupling piece 891 is connected to the base 81 of the actuator pin 8G. The coupling piece 891 has a plate shape. The thickness of the coupling piece 891 is aligned with the direction in which the actuator pin 8G advances. The two pressing pieces 892 protrude from the coupling piece 891 in the direction in which the actuator pin 8G advances. The protrusion lengths of the two pressing pieces 892 are equal to each other. The two pressing pieces 892 are associated one to one with the two separable portions 21.

When measured in the direction in which the actuator pin 8 advances, the distance between one of the two separable portions 21 and the actuator pin 8G is equal to the distance between the other of the two separable portions 21 and the actuator pin 8G. More specifically, when measured in the direction in which the actuator pin 8 advances, the distance between one of the two separable portions 21 and an associated one of the pressing pieces 892 is equal to the distance between the other of the two separable portions 21 and an associated one of the pressing pieces 892. Even more specifically, each of the two pressing pieces 892 is in contact with its associated separable portion 21. Thus, when measured in the direction in which the actuator pin 8 advances before the two separable portions 21 (namely, the first separable portion and the second separable portion) are cut off from the two terminal portions 22, the distance between the first separable portion and the actuator pin 8G facing the first separable portion is equal to the distance between the second separable portion and the actuator pin 8G facing the second separable portion. Specifically, the distance between each of the two separable portions 21 and the actuator pin 8G is zero. Nevertheless, in FIG. 18, the actuator pin 8G is illustrated as being out of contact with the two separable portions 21 for the sake of convenience.

One of the two pressing pieces 892 of the actuator pin 8G cuts off one of the two separable portions 21 (first separable portion) from the two terminal portions 22 by pressing the first separable portion. The other of the two pressing pieces 892 cuts off the other of the two separable portions 21 (second separable portion) from the two terminal portions 22 by pressing the second separable portion.

The timing when one of the two pressing pieces 892 of the actuator pin 8G presses the first separable portion is the same as the timing when the other of the two pressing pieces 892 presses the second separable portion. That is to say, the two pressing pieces 892 are in contact with the two separable portions 21, respectively. Thus, as the actuator pin 8G is driven under the pressure of the gas produced by the gas producer 7 (see FIG. 3), the two pressing pieces 892 press the two separable portions 21 simultaneously. This causes the two separable portions 21 of the electrical conductor 2G to start to be cut off simultaneously from the two terminal portions 22 and the coupling portion 26. Then, the two separable portions 21 will be completely cut off from the two terminal portions 22 and the coupling portion 26. The timing when one of the two separable portions 21 starts to be completely cut off by the actuator pin 8G is the same as the timing when the other separable portion starts to be completely cut off by the actuator pin 8G.

In this embodiment, the number of the separable portions 21 provided does not have to be two but may also be three or more. That is to say, three or more separable portions 21 may be electrically connected in series.

Also, at least one set selected from the group consisting of the set of the two separable portions 21D and two terminal portions 22D according to the fifth embodiment (see FIG. 10), the set of the first member 3 and second member 4 according to the sixth embodiment (see FIG. 11), and the set of the first member 3 and second member 4F according to the first variation of the sixth embodiment (see FIG. 12) may be electrically connected to the two terminal portions 22 according to this embodiment in series or parallel. That is to say, according to this embodiment, out of the plurality of separable portions 21, at least two separable portions 21 need to be electrically connected in series.

In the interrupter 1G according to this embodiment, the two separable portions 21 are electrically connected in series, and therefore, an arc voltage generated between the two separable portions 21 is divided and distributed in the two separable portions 21. This causes an increase in the arc voltage, thus allowing the interrupter 1G to have improved arc quenching capability.

Eighth Embodiment

Figure 19:
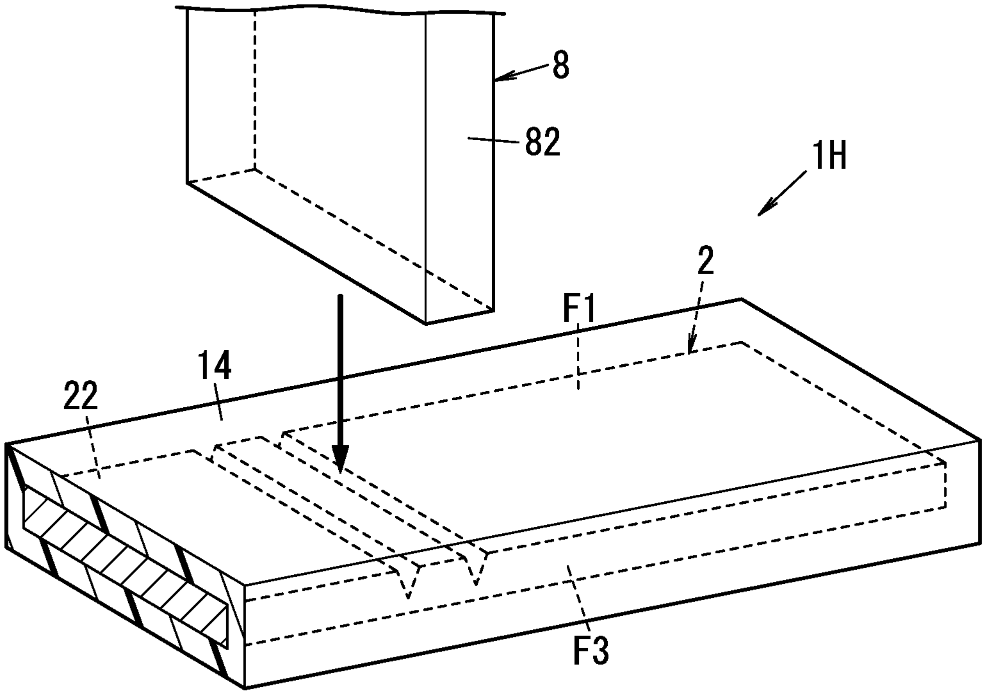
FIG. 19 is a perspective view of a principal part of an interrupter according to an eighth embodiment.

An interrupter 1H according to an eighth embodiment will now be described with reference to FIGS. 19, 20A, and 20B. In the following description, any constituent element of this eighth embodiment, having the same function as a counterpart of the first embodiment described above, will be designated by the same reference numeral as that counterpart's, and description thereof will be omitted herein.

The interrupter 1H further includes an electrically insulating mask 14. The mask 14 may be made of a resin, for example. The mask 14 covers both ends, facing the respective terminal portions 22, of the separable portion 21 and at least one of the respective ends, facing the separable portion 21, of the two terminal portions 22 (i.e., at least one of the two adjacent portions 220). In this embodiment, the mask 14 covers the entire separable portion 21 and both ends, facing the separable portion 21, of the two terminal portions 22 of the electrical conductor 2. That is to say, the mask 14 according to this embodiment covers the adjacent portions 220.

The mask 14 covers the electrical conductor 2 from both sides of its thickness and from both sides of its width. That is to say, the mask 14 covers the first surface F1 of the electrical conductor 2. The first surface F1 faces the actuator pin 8 in the direction in which the actuator pin 8 advances. In addition, the mask 14 also covers the second surface F2 of the electrical conductor 2. The second surface F2 is opposite from the first surface F1 in the direction in which the actuator pin 8 advances. Besides, the mask 14 further covers two third surfaces F3 of the electrical conductor 2. A normal to each of the two third surfaces F3 is aligned with a direction perpendicular to the direction in which the actuator pin 8 advances and a direction in which an electric current flows through the electrical conductor 2.

As in the first embodiment described above, the electrical conductor 2 also includes two boundary portions 23 between the separable portion 21 and the two terminal portions 22. When measured in a predetermined direction intersecting with the direction in which an electric current flows through the boundary portions 23, the dimension of each adjacent portion 220 is larger than the dimension of the boundary portion 23 adjacent to the adjacent portion 220. The direction in which the electric current flows through the boundary portions 23 is aligned with the longitudinal axis of the electrical conductor 2 (i.e., rightward/leftward direction on the paper on which FIG. 20A is drawn). The predetermined direction intersecting with the direction in which the electric current flows through the boundary portions 23 is aligned with the direction in which the actuator pin 8 advances (i.e., the upward/downward direction on the paper on which FIG. 20A is drawn).

Figure 20A:
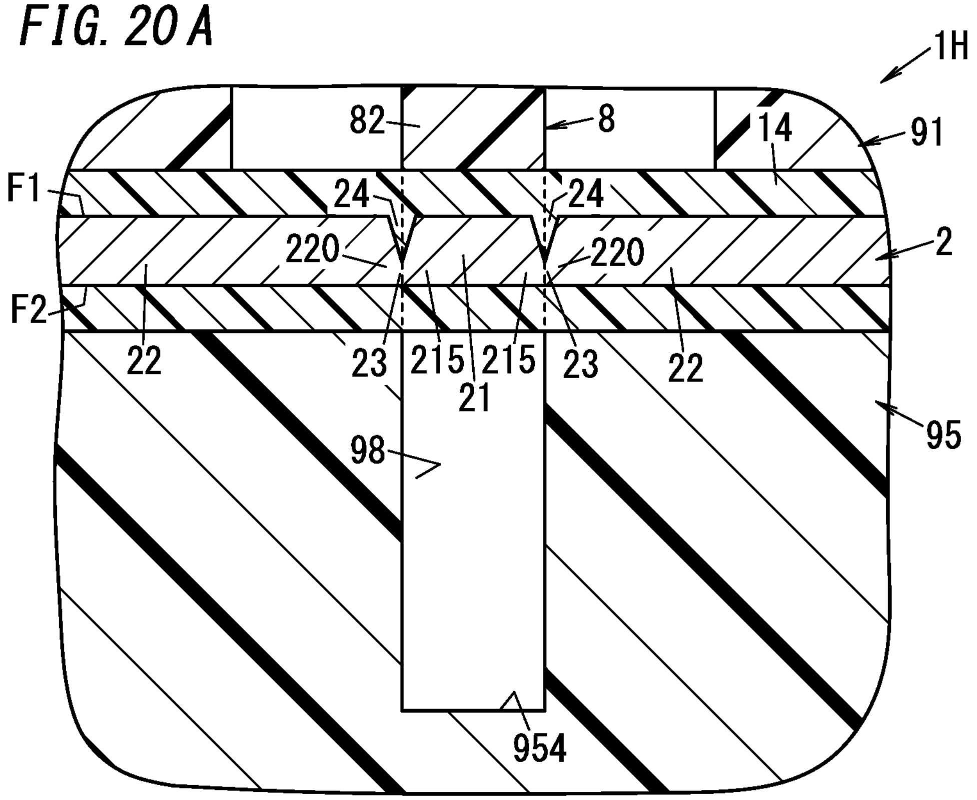
FIG. 20A is a cross-sectional view of a principal part of the interrupter, illustrating its state before an actuator pin is driven.
Figure 20B:
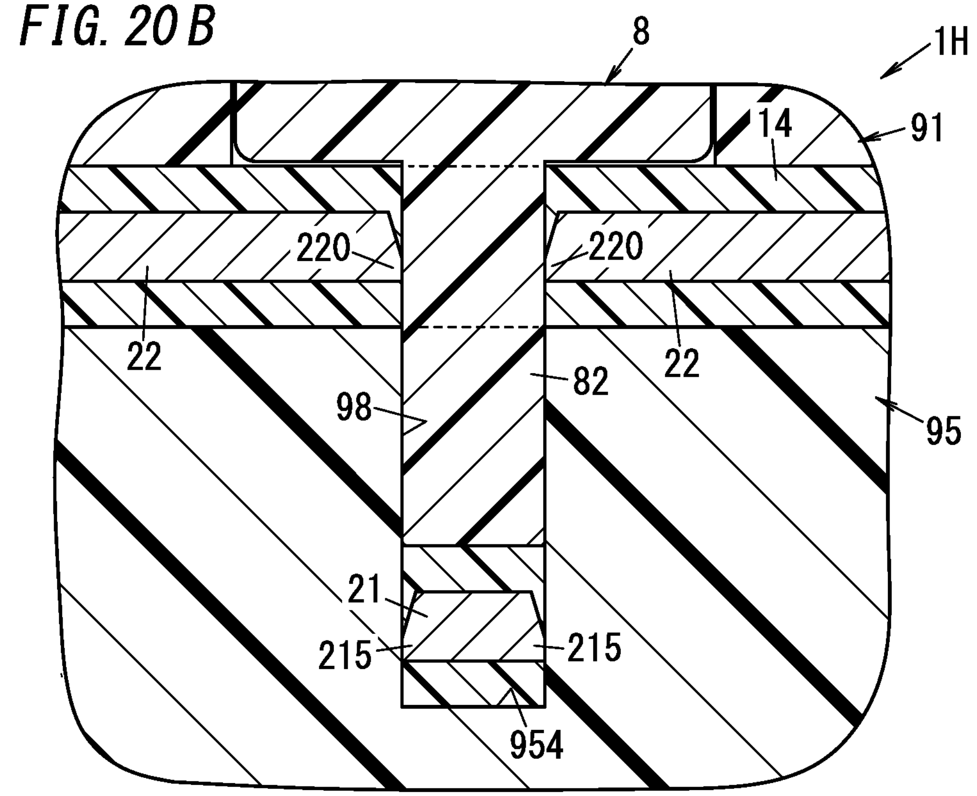
FIG. 20B is a cross-sectional view of the principal part of the interrupter, illustrating its state after the actuator pin has been driven.

As shown in FIGS. 20A and 20B, the protruding member 82 of the actuator pin 8 that has been driven under the pressure of the gas produced by the gas producer 7 (see FIG. 3) breaks the electrical conductor 2 at the boundary portions 23 between the separable portion 21 and the respective terminal portions 22 to come into contact with cross sections of the respective terminal portions 22. The protruding member 82 also breaks the mask 14 along with the electrical conductor 2. The protruding member 82 comes into contact with cross sections of the mask 14 as well.

When an arc is generated between the separable portion 21 and the respective terminal portions 22 as the electrical conductor 2 is broken, the mask 14 regulates the emission of constituent particles of the arc from the respective terminal portions 22. Examples of the constituent particles of the arc include electrons, a metallic vapor, and plasma particles. In addition, the protruding member 82 of the actuator pin 8 further regulates the emission of the constituent particles of the arc from each terminal portion 22. More specifically, an end portion, facing the separable portion 21, of each terminal portion 22 (i.e., the adjacent portion 220) is covered with the protruding member 82 along the longitudinal axis of the electrical conductor 2 and is also covered with the mask 14 along the thickness and width of the electrical conductor 2. This reduces the chances of the constituent particles of the arc being emitted from the respective adjacent portions 220 of the terminal portions 22. In particular, since the mask 14 covers the adjacent portions 220, parts, covering the adjacent portions 220, of the mask 14 reduce the emission of the constituent particles of the arc when the boundary portions 23 adjacent to the adjacent portions 220 are broken. In addition, covering the separable portion 21 with the mask 14 along the thickness and width of the electrical conductor 2 regulates the emission of the constituent particles of the arc.

Furthermore, the mask 14 also covers the inner surfaces of the grooves 24 of the electrical conductor 2. This reduces, when the separable portion 21 is cut off from the two terminal portions 22 as the boundary portions 23 are broken, the chances of respective faces, corresponding to the inner surfaces of the grooves 24, of the two terminal portions 22 and the separable portion 21 being exposed, thus regulating the emission of the constituent particles of the arc.

Regulating the emission of the constituent particles of the arc causes an increase in arc resistance and arc voltage, thus allowing the interrupter 1H to have improved arc quenching capability.

First Variation of Eighth Embodiment

Figure 21:
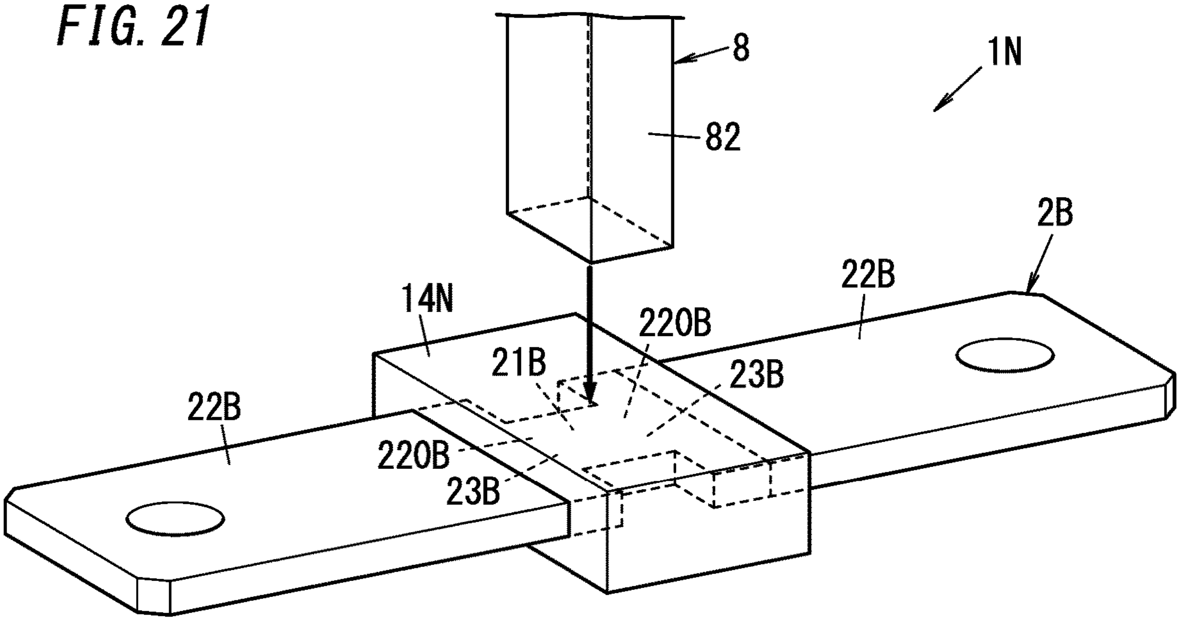
FIG. 21 is a perspective view of a principal part of an interrupter according to a first variation of the eighth embodiment.

An interrupter 1N according to a first variation of the eighth embodiment will be described with reference to FIGS. 21 and 22. This first variation is a variation of the interrupter 1B according to the third embodiment (see FIG. 7) with a mask 14N corresponding to the mask 14 of the eighth embodiment provided therefor as an additional constituent element. In the following description, any constituent element of this first variation, having the same function as a counterpart of the third embodiment described above, will be designated by the same reference numeral as that counterpart's, and description thereof will be omitted herein.

Figure 22:
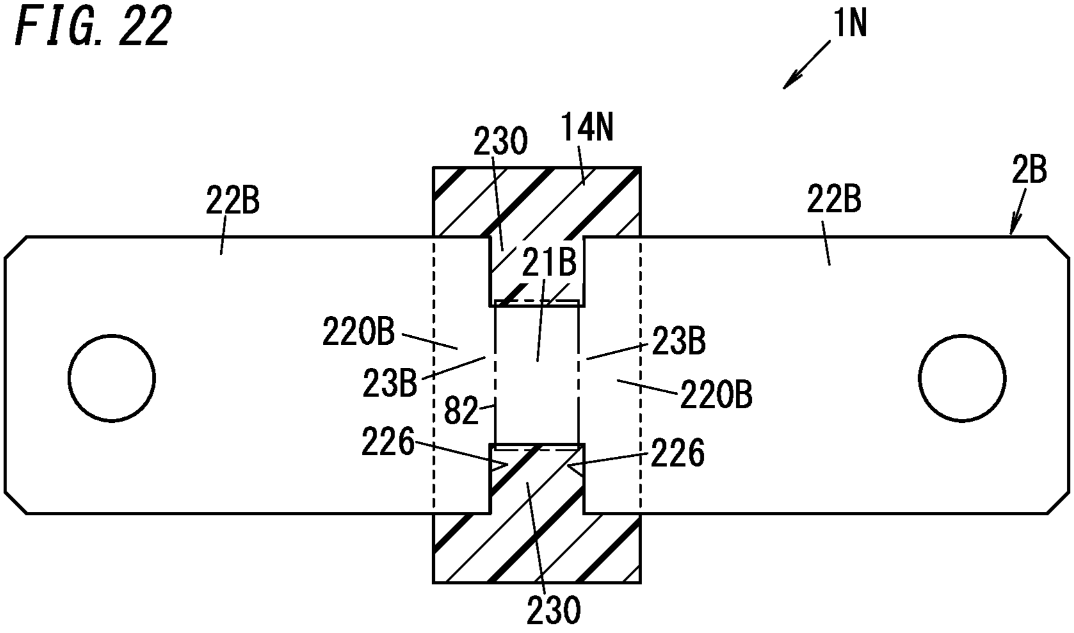
FIG. 22 is a cross-sectional view of the principal part of the interrupter.

FIG. 22 is a cross-sectional view of the electrical conductor 2B and the mask 14N. A normal to this cross section is aligned with the thickness of electrical conductor 2B. In addition, the normal to this cross section is also aligned with the direction in which the actuator pin 8 advances.

The mask 14N covers at least the respective adjacent portions 220B of the two terminal portions 22B. In addition, the mask 14N also covers the separable portion 21B. The mask 14N is provided to cover a range from the adjacent portion 220B of one of the two terminal portions 22B through the adjacent portion 220B of the other terminal portion 22B. The mask 14N covers the adjacent portions 220B and the separable portion 21B from both sides of the thickness of the electrical conductor 2 and from both sides of the width of the electrical conductor 2.

The protruding member 82 of the actuator pin 8 that has been driven under the pressure of the gas produced by the gas producer 7 (see FIG. 3) breaks the electrical conductor 2B at the boundary portions 23B between the separable portion 21B and the respective terminal portions 22B, thus separating the separable portion 21B from the two terminal portions 22B. The protruding member 82 also breaks the mask 14N along with the electrical conductor 2B. As indicated by the two-dot chains in FIG. 22, (the protruding member 82 of) the actuator pin 8 is arranged to penetrate through a portion, overlapping with the separable portion 21B in the direction in which the actuator pin 8 advances, of the mask 14N.

Even after the separable portion 21B has been separated from the two terminal portions 22B, a portion surrounding each adjacent portion 220B (e.g., the surface 226, facing the separable portion 21B, of the terminal portion 22B) is still covered with the mask 14N. This regulates the emission of constituent particles of the arc from around the adjacent portion 220B. In addition, even after the separable portion 21B has been separated from the two terminal portions 22B, part of the surface of the separable portion 21B is still covered with the mask 14N. This regulates the emission of the constituent particles of the arc from the separable portion 21B.

Optionally, the mask 14N may be provided for only regions that do not overlap with the separable portion 21B in the direction in which the actuator pin 8 advances. In other words, the mask 14N does not have to cover the separable portion 21B in the direction in which the actuator pin 8 advances. For example, the mask 14N may be provided to cover the adjacent portions 220B from both sides of the thickness of the electrical conductor 2 and from both sides of the width of the electrical conductor 2. Furthermore, the mask 14N may also be provided to cover the surface 226, facing the separable portion 21B, of each terminal portion 22B.

Other Variations of Eighth Embodiment

Next, variations of the eighth embodiment will be enumerated one after another. Optionally, the variations to be described below may be adopted in combination as appropriate. In the following description, any constituent element of these variations, having the same function as a counterpart of the eighth embodiment described above, will be designated by the same reference numeral as that counterpart's, and description thereof will be omitted herein.

In the eighth embodiment, the mask 14 covers the electrical conductor 2 from both sides of the thickness of the electrical conductor 2 and from both sides of the width of the electrical conductor 2. However, this is only an example of the present disclosure and should not be construed as limiting. Alternatively, the mask 14 may cover the electrical conductor 2 from only one side of the thickness of the electrical conductor 2 and/or from only one side of the width of the electrical conductor 2.

Optionally, respective parts, covering the boundary portions 23 between the separable portion 21 and the terminal portions 22, of the mask 14 may be formed to be easily breakable. For example, those parts, covering the boundary portions 23 between the separable portion 21 and the terminal portions 22, of the mask 14 may have grooves or may have at least one of their thickness or width reduced compared to their surrounding portions.

Alternatively, the mask 14 may also be provided not to cover the boundary portions 23 between the separable portion 21 and the respective terminal portions 22.

Figure 23A:
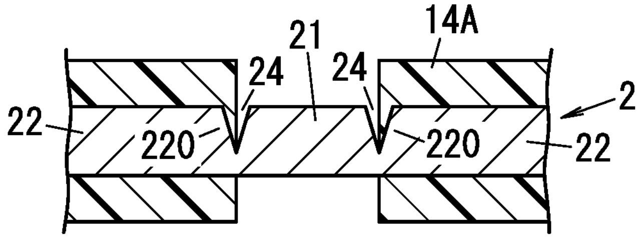
FIG. 23A is a cross-sectional view of a principal part of an interrupter according to a variation of the eighth embodiment.

Still alternatively, the mask 14A may cover only the two terminal portions 22 without covering the separable portion 21 as shown in FIG. 23A. Yet alternatively, the mask 14A may cover only one of the two terminal portions 22.

Yet alternatively, the mask 14A may cover only the adjacent portion 220 of at least one of the two terminal portions 22.

Figure 23B:
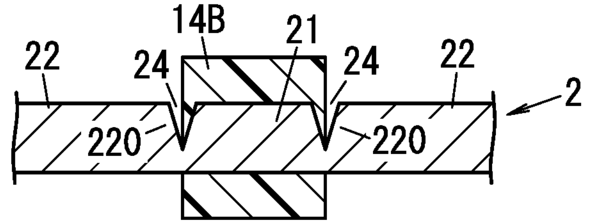
FIG. 23B is a cross-sectional view of a principal part of an interrupter according to another variation of the eighth embodiment.

Yet alternatively, as shown in FIG. 23B, the mask 14B may cover only the separable portion 21 without covering any of the two terminal portions 22. Yet alternatively, the mask 14B may cover only the separable portion 21 and one of the two terminal portions 22.

As shown in FIGS. 23A and 23B, the mask 14A (or 14B) suitably covers the inner surfaces of the grooves 24 at least partially. In addition, the mask 14A suitably covers the adjacent portion 220 of at least one of the two terminal portions 22.

Resume of Eighth Embodiment and Variations of Eighth Embodiment

The eighth embodiment and variations thereof described above may be specific implementations of the following aspects of the present disclosure.

In the interrupter 1H (or 1N) according to the eighth embodiment and the first variation thereof, each terminal portion 22 (or 22B) includes an adjacent portion 220 (or 220B). The adjacent portion 220 (or 220B) is adjacent to the boundary portion 23 (or 23B). When measured in a predetermined direction intersecting with a direction in which an electric current flows through the boundary portion 23 (or 23B), the dimension of the adjacent portion 220 (or 220B) is larger than the dimension of the boundary portion 23 (or 23B). The mask 14 (or 14A, 14B, 14N) covers the adjacent portion 220 (or 220B).

This configuration allows emission of constituent particles of the arc from the electrical conductor 2 (or 2B) to be regulated by the mask 14 (or 14A, 14B, 14N), thus causing an increase in the arc voltage and thereby allowing the interrupter 1H (or 1N) to have improved arc quenching capability.

Also, the interrupter 1H (or 1N) according to the eighth embodiment and the first variation thereof further includes an electrically insulating mask 14 (or 14A, 14B, 14N). The mask 14 (or 14A, 14B, 14N) covers at least one of an end 215, facing a terminal portion 22 (or 22B), of the separable portion 21 (or 21B) or an end (adjacent portion 220 or 220B), facing the separable portion 21 (or 21B), of the terminal portion 22 (or 22B). The actuator pin 8 driven under the pressure of a gas produced by the gas producer 7 breaks the electrical conductor 2 (or 2B) at the boundary portion 23 (or 23B) between the separable portion 21 (or 21B) and the terminal portion 22 (or 22B) and comes into contact with a cross section of the terminal portion 22 (or 22B).

This configuration allows emission of constituent particles of an arc to be regulated in a portion, covered with the electrically insulating mask 14 (or 14A, 14B, 14N), of the electrical conductor 2(or 2B). This causes an increase in arc resistance and arc voltage, thus allowing the interrupter 1H (or 1N) to have improved arc quenching capability. In addition, bringing the actuator pin 8 into contact with a cross section of the electrical conductor 2 (or 2B) confines the movable range of the arc on the cross section of the electrical conductor 2 (or 2B), thus causing an increase in the arc voltage and allowing the interrupter 1H (or 1N) to have improved arc quenching capability.

Furthermore, in the interrupter 1H according to the eighth embodiment, the electrical conductor 2 has a groove 24. The groove 24 has a bottom portion thereof defined by the boundary portion 23 and has a side portion thereof defined by the adjacent portion 220.

This configuration allows the separable portion 21 to be cut off from the terminal portion 22 along the groove 24, thus facilitating cutting off the separable portion 21 from the terminal portion 22 compared to a situation where no grooves 24 are provided.

Furthermore, in the interrupter 1H according to the eighth embodiment, when measured in a direction in which the actuator pin 8 advances, the dimension of the adjacent portion 220 is larger than the dimension of the boundary portion 23.

This configuration allows the electrical conductor 2 to be broken along the boundary portion 23, having a smaller dimension than the adjacent portion 220, thus facilitating cutting off the separable portion 21 from the terminal portion 22.

Furthermore, in the interrupter 1N according to the first variation of the eighth embodiment, when measured in a direction perpendicular to the direction in which the actuator pin 8 advances and intersecting with a direction in which an electric current flows through the boundary portion 23B, the dimension of the adjacent portion 220B is larger than the dimension of the boundary portion 23B.

This configuration allows the electrical conductor 2B to be broken along the boundary portion 23B, having a smaller dimension than the adjacent portion 220B, thus facilitating cutting off the separable portion 21B from the terminal portion 22B.

Ninth Embodiment

Figure 24:
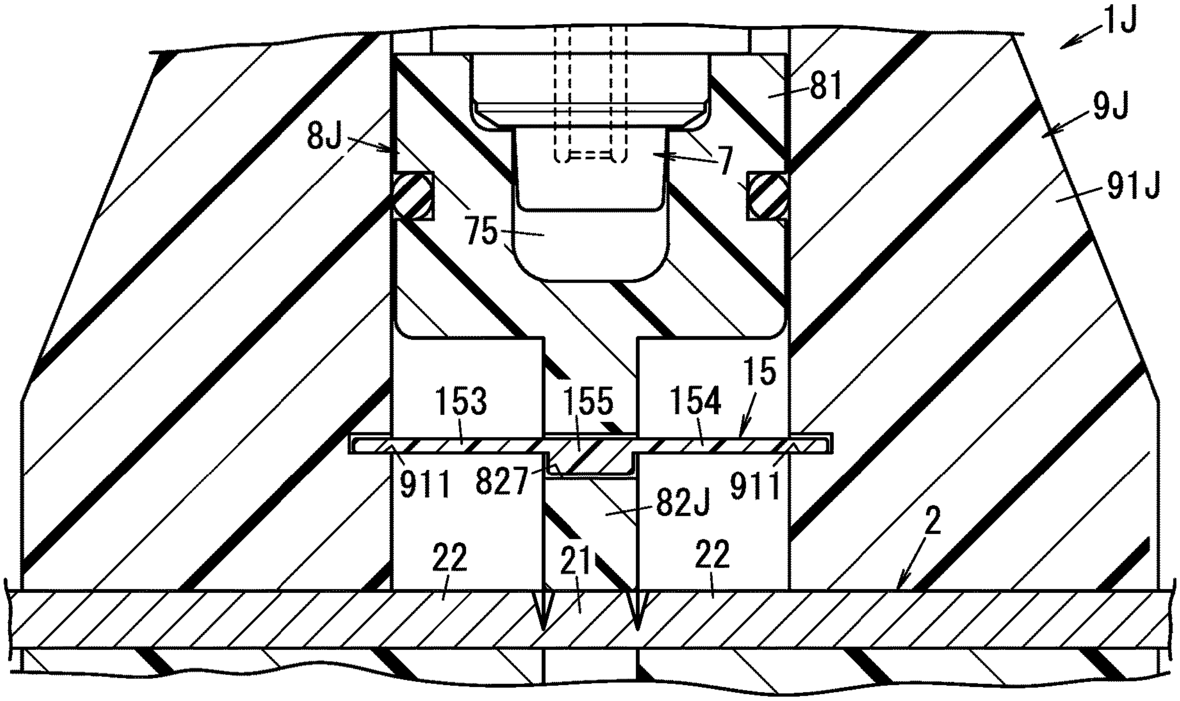
FIG. 24 is a cross-sectional view of a principal part of an interrupter according to a ninth embodiment.

An interrupter 1J according to a ninth embodiment will now be described with reference to FIG. 24. In the following description, any constituent element of this ninth embodiment, having the same function as a counterpart of the first embodiment described above, will be designated by the same reference numeral as that counterpart's, and description thereof will be omitted herein.

The interrupter 1J further includes a stopper 15. The stopper 15 may be made of a resin, for example. The stopper 15 has a bar shape. The stopper 15 includes a first end portion 153 with a first end of the stopper 15, a second end portion 154 with a second end of the stopper 15, and an intermediate portion 155 between the first end portion 153 and the second end portion 154. The first end portion 153 and the second end portion 154 are thinner than the intermediate portion 155. Thus, the stopper 15 is easily breakable at the first end portion 153 and the second end portion 154.

The protruding member 82J of the actuator pin 8J has an insert hole 827 to which the intermediate portion 155 is inserted. The inner surface of the first body 91 of the housing portion 9J has two recesses 911 to which the first and second ends of the stopper 15 are respectively inserted. Inserting the first and second ends of the stopper 15 into the two recesses 911, respectively, regulates the movement of the actuator pin 8J.

The stopper 15 is to be broken by the force applied from the actuator pin 8J driven under the pressure of the gas produced by the gas producer 7. Until the stopper 15 is broken, the stopper 15 prevents the actuator pin 8J from applying force to the electrical conductor 2. That is to say, the stopper 15 regulates the movement of the actuator pin 8J before the actuator pin 8J is driven under the pressure of the gas produced by the gas producer 7.

As the actuator pin 8J is driven by the gas producer 7, the stopper 15 initially prevents the protruding member 82J of the actuator pin 8J from applying force to the electrical conductor 2. However, when the pressure in the pressurizing chamber 75 increases to the point of causing the protruding member 82J to break the stopper 15, the protruding member 82J breaks the electrical conductor 2 by applying force thereto, thereby cutting off the separable portion 21 from the two terminal portions 22. That is to say, the actuator pin 8J is driven under the pressure of the gas produced by the gas producer 7 to move in such a manner as to break the stopper 15 and cut off the separable portion 21 from the two terminal portions 22.

According to this embodiment, it is not until the pressure in the pressurizing chamber 75 reaches a higher level compared to a situation where no stopper 15 is provided that the actuator pin 8J presses the electrical conductor 2. This causes the separable portion 21 to be cut off from the two terminal portions 22 with more momentum, thus more rapidly stretching the arc generated between the separable portion 21 and the two terminal portions 22. This allows the interrupter 1J to have improved arc quenching capability.

The stopper 15 may also be formed in a plate shape, instead of the bar shape.

First Variation of Ninth Embodiment

Figure 25:
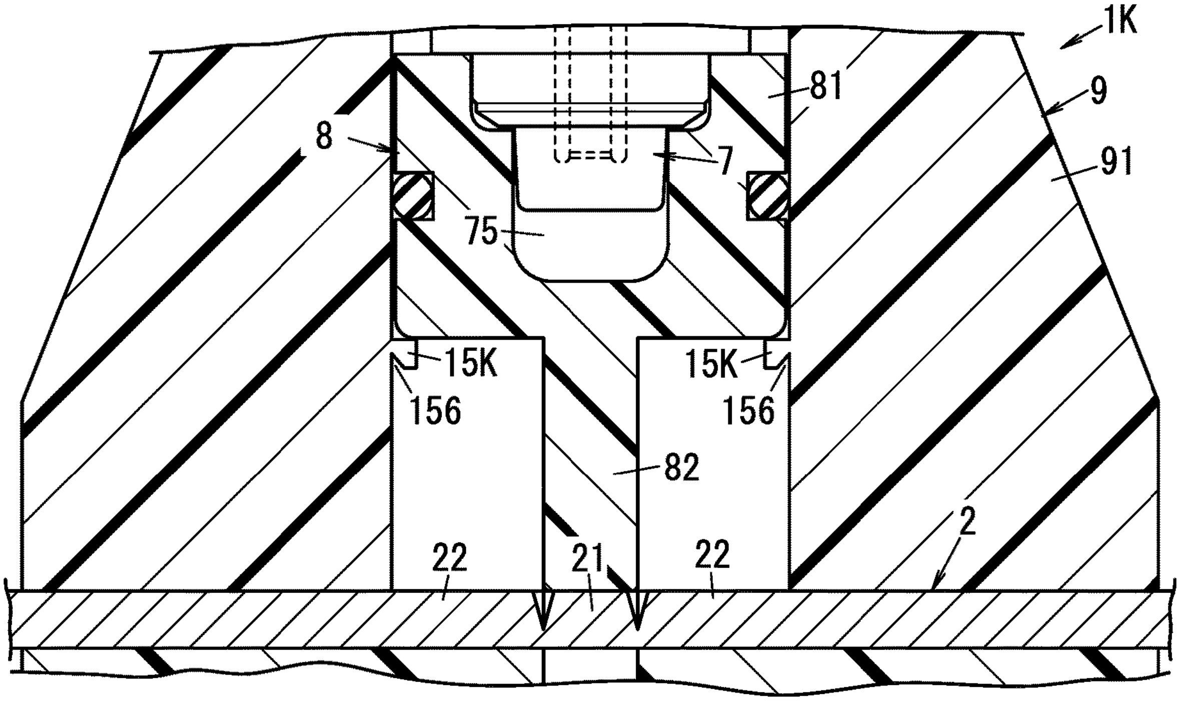
FIG. 25 is a cross-sectional view of a principal part of an interrupter according to a first variation of the ninth embodiment.

An interrupter 1K according to a first variation of the ninth embodiment will now be described with reference to FIG. 25. In the following description, any constituent element of this first variation, having the same function as a counterpart of the first embodiment described above, will be designated by the same reference numeral as that counterpart's, and description thereof will be omitted herein.

The interrupter 1K includes not only every constituent element of the interrupter 1 according to the first embodiment but also a plurality of (e.g., two in the example illustrated in FIG. 25) stoppers 15K. The plurality of stoppers 15K protrude from the inner surface of the first body 91 of the housing portion 9. The plurality of stoppers 15K are in contact with the base 81 of the actuator pin 8. The plurality of stoppers 15K are located in a direction toward which the base 81 advances. Each stopper 15K has a groove 156 in its portion adjacent to the first body 91. This makes each stopper 15K easily breakable at the portion with the groove 156.

As the actuator pin 8 is driven by the gas producer 7, the stoppers 15K initially prevent the protruding member 82 of the actuator pin 8 from applying force to the electrical conductor 2 because the base 81 is in contact with the plurality of stoppers 15K. However, when the pressure in the pressurizing chamber 75 increases to the point of causing the protruding member 82 to break the stoppers 15K, the protruding member 82 breaks the electrical conductor 2 by applying force thereto, thereby cutting off the separable portion 21 from the two terminal portions 22.

Alternatively, the interrupter 1K may include a single annular stopper instead of the plurality of stoppers 15K. In that case, the annular stopper may be formed in the shape of a ring protruding from, and extending along, the inner surface of the first body 91.

Second Variation of Ninth Embodiment

Figure 26:
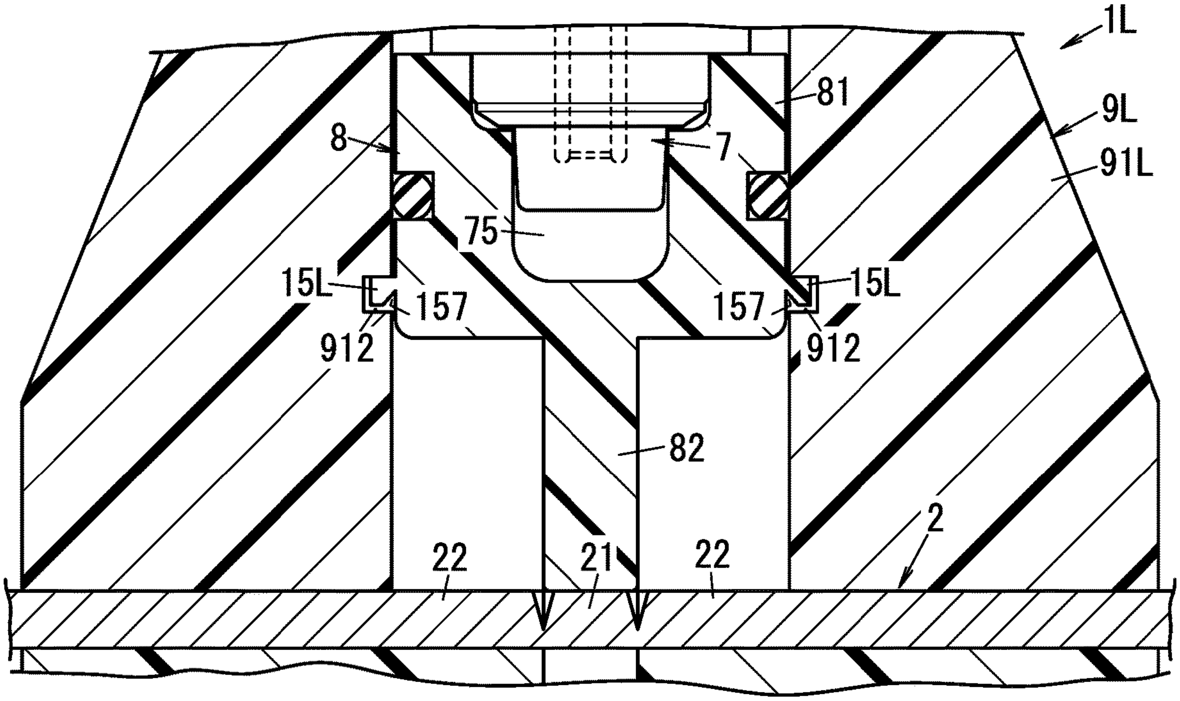
FIG. 26 is a cross-sectional view of a principal part of an interrupter according to a second variation of the ninth embodiment.

An interrupter 1L according to a second variation of the ninth embodiment will now be described with reference to FIG. 26. In the following description, any constituent element of this second variation, having the same function as a counterpart of the first embodiment described above, will be designated by the same reference numeral as that counterpart's, and description thereof will be omitted herein.

The interrupter 1L includes not only every constituent element of the interrupter 1 according to the first embodiment but also a plurality of (e.g., two in the example illustrated in FIG. 26) stoppers 15L. The plurality of stoppers 15L protrude from the base 81 of the actuator pin 8. The inner surface of the first body 91 of the housing portion 9L has a plurality of (e.g., two in the example illustrated in FIG. 26) recesses 912 to which the plurality of stoppers 15L are inserted.

A part, adjacent to the base 81 of the actuator pin 8, of each stopper 15L has a groove 157. This makes each stopper 15L easily breakable at its part with the groove 157.

As the actuator pin 8 is driven by the gas producer 7, the stoppers 15L initially prevent the protruding member 82 of the actuator pin 8 from applying force to the electrical conductor 2 because the movement of the plurality of stoppers 15L is regulated by the first body 91 at the plurality of recesses 912. However, when the pressure in the pressurizing chamber 75 increases to the point of breaking the plurality of stoppers 15L, the protruding member 82 breaks the electrical conductor 2 by applying force thereto, thereby cutting off the separable portion 21 from the two terminal portions 22.

Alternatively, the interrupter 1L may include a single annular stopper instead of the plurality of stoppers 15L. In that case, the annular stopper may be formed in the shape of a ring protruding from, and extending along, the outer peripheral surface of the base 81.

Resume of Ninth Embodiment and First and Second Variations of Ninth Embodiment The ninth embodiment and first and second variations thereof described above may be specific implementations of the following aspects of the present disclosure.

An interrupter 1J (or 1K, 1L) according to the ninth embodiment and the first and second variations thereof further includes a stopper 15 (or 15K, 15L). The stopper 15 (or 15K, 15L) regulates movement of the actuator pin 8 (or 8J) before the actuator pin 8 (or 8J) is driven under pressure of the gas produced by the gas producer 7. When driven under the pressure of the gas, the actuator pin 8 (or 8J) moves to break the stopper 15 (or 15K, 15L) and cut off the separable portion 21 from the terminal portion 22.

According to this configuration, it is not until the magnitude of the force applied from the actuator pin 8 (or 8J) to the stopper 15 (or 15K, 15L) becomes great enough to break the stopper 15 (or 15K, 15L) that the actuator pin 8 (or 8J) breaks the electrical conductor 2 by applying force thereto. This allows the separable portion 21 to be cut off from the terminal portion 22 with more momentum, and the arc to be stretched more rapidly, compared to a situation where no stoppers 15 (or 15K, 15L) are provided, thus allowing the interrupter 1J (or 1K, 1L) to have improved arc quenching capability.

Optionally, the embodiments described above, including variations thereof, may be adopted in combination as appropriate.

(Recapitulation)

The embodiments and their variations described above may be specific implementations of the following aspects of the present disclosure.

An interrupter 1E (or 1F, 1M) according to a first aspect includes a gas producer 7, an actuator pin 8 (or 8D), and an electrical conductor 2E (or 2F, 2M). The gas producer 7 produces a gas by burning a fuel 74. The actuator pin 8 (or 8D) is driven under pressure of the gas produced by the gas producer 7. The electrical conductor 2E (or 2F, 2M) electrically connects two terminals 208 of an external electric circuit EC10. The electrical conductor 2E (or 2F, 2M) includes a first terminal portion 32 (or first terminal part 221), a first separable portion 31 (or 211), a second terminal portion 42 (42F, or second terminal part 222), and a second separable portion 41 (or 212). The first separable portion 31 (or 211) is connected to the first terminal portion 32 (or first terminal part 221). The second terminal portion 42 (42F, or second terminal part 222) is electrically connected to the first terminal portion 32 (or first terminal part 221). The second separable portion 41 (or 212) is connected to the second terminal portion 42 (42F, or second terminal part 222). The second separable portion 41 (or 212) is electrically connected to the first separable portion 31 (or 211) in parallel. The first separable portion 31 (or 211) is cut off from the first terminal portion 32 (or first terminal part 221) by the actuator pin 8 (or 8D) driven. The second separable portion 41 (or 212) is cut off from the second terminal portion 42 (42F, or second terminal part 222) by the actuator pin 8 (or 8D) driven. A first timing when the first separable portion 31 (or 211) starts to be cut off from the first terminal portion 32 (or first terminal part 221) is earlier than a second timing when the second separable portion 41 (or 212) starts to be cut off from the second terminal portion 42 (42F, or second terminal part 222).

In an interrupter 1E (or 1F) according to a second aspect, which may be implemented in conjunction with the first aspect, at a point in time prior to the first timing, the first separable portion 31 and the second separable portion 41 are arranged side by side in a direction in which the actuator pin 8 advances.

In an interrupter 1F (or 1M) according to a third aspect, which may be implemented in conjunction with the second aspect, at the point in time prior to the first timing, the first separable portion 31 (or 211) and the second separable portion 41 (or 212) are arranged side by side and spaced apart from each other in the direction in which the actuator pin 8 (or 8D) advances.

In an interrupter 1E according to a fourth aspect, which may be implemented in conjunction with the second aspect, at the point in time prior to the first timing, the first separable portion 31 is either in contact with, or joined to, the second separable portion 41.

In an interrupter 1E (or 1F) according to a fifth aspect, which may be implemented in conjunction with any one of the first to fourth aspects, at a point in time prior to the first timing, an electrical resistance of the first separable portion 31 as measured in a direction in which an electric current flows through the first separable portion 31 is smaller than an electrical resistance of the second separable portion 41 as measured in a direction in which an electric current flows through the second separable portion 41.

In an interrupter 1E (or 1F) according to a sixth aspect, which may be implemented in conjunction with any one of the first to fifth aspects, a melting point of the second separable portion 41 is higher than a melting point of the first separable portion 31.

An interrupter 1H (or 1N) according to a seventh aspect includes a gas producer 7, an actuator pin 8, an electrical conductor 2 (or 2B), and a mask 14 (or 14A, 14B, 14N). The gas producer 7 produces a gas by burning a fuel 74. The actuator pin 8 is driven under pressure of the gas produced by the gas producer 7. The electrical conductor 2 (or 2B) electrically connects two terminals 208 of an external electric circuit EC10. The mask 14 (or 14A, 14B, 14N) has electrical insulation properties. The electrical conductor 2 (or 2B) includes a terminal portion 22 (or 22B), a separable portion 21 (or 21B), and a boundary portion 23 (or 23B). The separable portion 21 (or 21B) is connected to the terminal portion 22 (or 22B). The boundary portion 23 (or 23B) couples the terminal portion 22 (or 22B) and the separable portion 21 (or 21B) together. The separable portion 21 (or 21B) is cut off from the terminal portion 22 (or 22B) by the actuator pin 8 (or 8D) driven. The terminal portion 22 (or 22B) includes an adjacent portion 220 (or 220B). The adjacent portion 220 (or 220B) is adjacent to the boundary portion 23 (or 23B). When measured in a predetermined direction, a dimension of the adjacent portion 220 (or 220B) is larger than a dimension of the boundary portion 23 (or 23B). The predetermined direction intersects with a direction in which an electric current flows through the boundary portion 23 (or 23B). The mask 14 (or 14A, 14B, 14N) covers the adjacent portion 220 (or 220B).

In an interrupter 1H according to an eighth aspect, which may be implemented in conjunction with the seventh aspect, the electrical conductor 2 has a groove 24. The groove 24 has its bottom portion defined by the boundary portion 23 and has its side portion defined by the adjacent portion 220.

In an interrupter 1H according to a ninth aspect, which may be implemented in conjunction with the seventh or eighth aspect, when measured in a direction in which the actuator pin 8 advances, a dimension of the adjacent portion 220 is larger than a dimension of the boundary portion 23.

In an interrupter 1N according to a tenth aspect, which may be implemented in conjunction with any one of the seventh to ninth aspects, when measured in a direction perpendicular to the direction in which the actuator pin 8 advances and intersecting with a direction in which an electric current flows through the boundary portion 23B, a dimension of the adjacent portion 220 is larger than a dimension of the boundary portion 23B.

An interrupter 1 according to an eleventh aspect includes a gas producer 7, an actuator pin 8, and an electrical conductor 2. The gas producer 7 produces a gas by burning a fuel 74. The actuator pin 8 is driven under pressure of the gas produced by the gas producer 7. The electrical conductor 2 includes a separable portion 21 and a terminal portion 22. The separable portion 21 forms part of an electric circuit EC1. The terminal portion 22 is connected to the separable portion 21. The terminal portion 22 forms another part of the electric circuit EC1. The separable portion 21 is cut off from the terminal portion 22 by the actuator pin 8 driven. A breaking strength of a boundary portion 23 between the separable portion 21 and the terminal portion 22 is equal to or less than a breaking strength of a portion (adjacent portion 220), located adjacent to the boundary portion 23, of the terminal portion 22.

In an interrupter 1 according to a twelfth aspect, which may be implemented in conjunction with the eleventh aspect, the boundary portion 23, located between the separable portion 21 and the terminal portion 22, of the electrical conductor 2 has a groove 24.

In an interrupter 1A according to a thirteenth aspect, which may be implemented in conjunction with the eleventh or twelfth aspect, when measured in a direction in which the actuator pin 8 advances, a dimension of the separable portion 21A is smaller than a dimension of the terminal portion 22A adjacent to the separable portion 21A.

In an interrupter 1B according to a fourteenth aspect, which may be implemented in conjunction with any one of the eleventh to thirteenth aspects, when measured in a direction perpendicular to a direction in which the actuator pin 8 advances and a direction in which an electric current flows through the electrical conductor 2B, a dimension of the separable portion 21B is smaller than a dimension of the terminal portion 22B.

An interrupter 1 according to a fifteen aspect, which may be implemented in conjunction with any one of the seventh to fourteenth aspects, further includes a housing portion 9. The housing portion 9 has a housing space 98. The housing space 98 houses the separable portion 21 that has been cut off from the terminal portion 22.

An interrupter 1C according to a sixteenth aspect, which may be implemented in conjunction with the fifteen aspect, further includes a permanent magnet 61. In a direction in which the actuator pin 8 advances, the separable portion 21C is located between the actuator pin 8 and the housing space 98C. The permanent magnet 61 is arranged to apply Lorentz force to an electric current flowing through the electrical conductor 2C. The Lorentz force is directed toward the housing space 98C.

An interrupter 1 according to a seventeenth aspect, which may be implemented in conjunction with the fifteen or sixteenth aspect, further includes an arc quenching member 13. The arc quenching member 13 has an arc quenching function. The arc quenching member 13 is arranged in the housing space 98.

In an interrupter 1 according to an eighteenth aspect, which may be implemented in conjunction with any one of the fifteen to seventeenth aspects, after the separable portion 21 has been cut off from the terminal portion 22 by the actuator pin 8, an outer peripheral surface 822 of the actuator pin 8 is in contact with an inner surface (inner peripheral surface 953) of the housing space 98 of the housing portion 9.

In an interrupter 1 according to a nineteenth aspect, which may be implemented in conjunction with any one of the fifteen to eighteenth aspects, after the separable portion 21 has been cut off from the terminal portion 22 by the actuator pin 8, the actuator pin 8 pinches the separable portion 21 between a tip 86 of the actuator pin 8 in the direction in which the actuator pin 8 advances and an inner surface (inner bottom surface 954) of the housing space 98 of the housing portion 9.

In an interrupter 1E (or 1F, 1M) according to a twentieth aspect, which may be implemented in conjunction with any one of the seventh to nineteenth aspects, the electrical conductor 2E (or 2F, 2M) includes a plurality of separable portions. Two out of the plurality of separable portions serve as a first separable portion 31 (or 211) and a second separable portion 41 (or 212), respectively. The actuator pin 8 cuts off the first separable portion 31 (or 211) from the terminal portion (first terminal portion 32 or first terminal part 221) by pressing the first separable portion 31 (or 211) and also cuts off the second separable portion 41 (or 212) from the terminal portion (second terminal portion 42, 42F, or second terminal part 222) by pressing the second separable portion 41 (or 212). Before the plurality of the separable portions are cut off from the terminal portion, a distance between the first separable portion 31 (or 211) and the actuator pin 8 (or 8D) is shorter than a distance L1 (or L2) between the second separable portion 41 (or 212) and the actuator pin 8 (or 8D) when measured in a direction in which the actuator pin 8 (or 8D) advances.

In an interrupter 1D according to a twenty-first aspect, which may be implemented in conjunction with any one of the seventh to twentieth aspects, the electrical conductor 2D includes a plurality of separable portions 21D. Two out of the plurality of separable portions 21D serve as a first separable portion 211 and a second separable portion 212, respectively. The first separable portion 211 and the second separable portion 212 are electrically connected in either series or parallel. The actuator pin 8D cuts off the first separable portion 211 from the terminal portion 22D by pressing the first separable portion 211 and also cuts off the second separable portion 212 from the terminal portion 22D by pressing the second separable portion 212. Before the plurality of the separable portions 21D are cut off from the terminal portion 22D, a distance between the first separable portion 211 and the actuator pin 8D facing the first separable portion 211 is equal to a distance between the second separable portion 212 and the actuator pin 8D facing the second separable portion 212 when measured in a direction in which the actuator pin 8D advances.

An interrupter 1J (or 1K, 1L) according to a twenty-second aspect, which may be implemented in conjunction with any one of the seventh to twenty-first aspects, further includes a stopper 15 (or 15K, 15L). The stopper 15 (or 15K, 15L) regulates movement of the actuator pin 8 (or 8J) before the actuator pin 8 (or 8J) is driven under pressure of the gas produced by the gas producer 7. When driven under the pressure of the gas, the actuator pin 8 (or 8J) breaks the stopper 15 (or 15K, 15L) and moves to cut off the separable portion 21 from the terminal portion 22.

An interrupter system 100 according to a twenty-third aspect includes a plurality of the interrupters 1 according to any one of the first to twenty-second aspects. The plurality of the interrupters 1 are electrically connected in series, parallel, or a combination of both series and parallel.

An interrupter 1E (or 1F, 1M) according to a twenty-fourth aspect includes a gas producer 7, an actuator pin 8 (or 8D), and an electrical conductor 2E (or 2F, 2M). The gas producer 7 produces a gas by burning a fuel 74. The actuator pin 8 (or 8D) is driven under pressure of the gas produced by the gas producer 7. The electrical conductor 2E (or 2F, 2M) electrically connects two terminals 208 of an external electric circuit EC10. The electrical conductor 2E (or 2F, 2M) includes a first terminal portion 32 (or first terminal part 221), a first separable portion 31 (or 211), a second terminal portion 42 (42F, or second terminal part 222), and a second separable portion 41 (or 212). The first separable portion 31 (or 211) is connected to the first terminal portion 32 (or first terminal part 221). The second terminal portion 42 (42F, or second terminal part 222) is electrically connected to the first terminal portion 32 (or first terminal part 221). The second separable portion 41 (or 212) is connected to the second terminal portion 42 (42F, or second terminal part 222). The second separable portion 41 (or 212) is electrically connected to the first separable portion 31 (or 211) in parallel. The actuator pin 8 (or 8D) is movable in a first direction. The first separable portion 31 (or 211) and the second separable portion 41 (or 212) are extended in a second direction. The second direction is perpendicular to the first direction. At least the first separable portion 31 (or 211) is cut off from the first terminal portion 32 (or first terminal part 221) by the actuator pin 8 (or 8D) driven. Before the actuator pin 8 (or 8D) is driven, a distance L1 (or L2) measured in the first direction between the actuator pin 8 (or 8D) and the second separable portion 41 (or 212) is longer, when viewed in a third direction, than a distance measured in the first direction between the actuator pin 8 (or 8D) and the first separable portion 31 (or 211). The third direction is perpendicular to both the first direction and the second direction.

In an interrupter 1E (or 1F) according to a twenty-fifth aspect, before the actuator pin 8 is driven, the first separable portion 31 and the second separable portion 41 are arranged side by side in the first direction.

In an interrupter 1F according to a twenty-sixth aspect, before the actuator pin 8 is driven, the first separable portion 31 and the second separable portion 41 are arranged side by side and spaced apart from each other in the first direction.

In an interrupter 1E (or 1F, 1M) according to a twenty-seventh aspect, an electrical resistance of the first separable portion 31 (or 211) as measured in the second direction is smaller than an electrical resistance of the second separable portion 41 (or 212) as measured in the second direction.

In an interrupter 1E (or 1F) according to a twenty-eighth aspect, a melting point of the second separable portion 41 is higher than a melting point of the first separable portion 31.

In an interrupter 1E (or 1F, 1M) according to a twenty-ninth aspect, when measured in the first direction, a thickness of the first separable portion 31 (or 211) is greater than a thickness of the second separable portion 41 (or 212).

REFERENCE SIGNS LIST

1, 1A, 1B, 1C, 1D, 1E, 1F, 1G, 1H, 1J, 1K, 1L, 1M, 1N Interrupter
13 Arc Quenching Member
14, 14A, 14B, 14N Mask
15, 15K, 15L Stopper
100 Interrupter System
2, 2A, 2B, 2C, 2D, 2E, 2F, 2G, 2M Electrical Conductor
21, 21A, 21B, 21C, 21D Separable Portion
211 First Separable Portion
212 Second Separable Portion
22, 22A, 22B, 22C, 22D Terminal Portion
220, 220A, 220B Adjacent Portion
221 First Terminal Part
222 Second Terminal Part
23, 23A, 23B Boundary Portion

24 Groove
31 First Separable Portion
32 First Terminal Portion
41 Second Separable Portion
42, 42F Second Terminal Portion
61 Permanent Magnet
7 Gas Producer
74 Fuel
8, 8D, 8G, 8J Actuator pin
86 Tip
822 Outer Peripheral Surface
9, 9C, 9J, 9L Housing Portion
953 Inner Peripheral Surface (Inner Surface)
954 Inner Bottom Surface (Inner Surface)
98, 98C Housing Space
208 Terminal
EC1 Electric Circuit
EC10 External Electric Circuit
L1, L2 Distance

The invention claimed is:

1. An interrupter comprising:

a gas producer configured to produce a gas by burning a fuel;

an actuator pin configured to be driven under pressure of the gas produced by the gas producer;

a first electrical conductor configured to electrically connect two terminals of an external electric circuit; and a second electrical conductor configured to electrically connect the two terminals of the external electric circuit, the first electrical conductor including:

a first terminal portion;

a third terminal portion; and a first separable portion connected to the first terminal portion and the third terminal portion, the second electrical conductor including:

a second terminal portion electrically connected to the first terminal portion;

a fourth terminal portion electrically connected to the third terminal portion; and a second separable portion connected to the second terminal portion and the fourth terminal portion, the first electrical conductor and the second electrical conductor being separate electrical conductors, the first separable portion being configured to be separated from the first terminal portion and the third terminal portion by the actuator pin, the second separable portion being configured to, after the first separable portion is separated from the first terminal portion and the third terminal portion, be separated cut off from the second terminal portion and the fourth terminal portion by the actuator pin driven, and a thickness of the first separable portion being greater than a thickness of the second separable portion.

2. The interrupter of claim 1, wherein at a point in time prior to a first timing at which the first separable portion starts to be separated from the first terminal portion and the third terminal portion, the first separable portion and the second separable portion are arranged side by side in a direction in which the actuator pin advances.

3. The interrupter of claim 2, wherein at the point in time prior to the first timing, the first separable portion and the second separable portion are arranged side by side and spaced apart from each other in the direction in which the actuator pin advances.

4. The interrupter of claim 2, wherein at the point in time prior to the first timing, the first separable portion is either in contact with, or joined to, the second separable portion.

5. The interrupter of claim 1, wherein at a point in time prior to a first timing at which the first separable portion starts to be separated from the first terminal portion and the third terminal portion, an electrical resistance of the first separable portion as measured in a direction in which an electric current flows through the first separable portion is smaller than an electrical resistance of the second separable portion as measured in a direction in which an electric current flows through the second separable portion.

6. The interrupter of claim 1, wherein a melting point of the second separable portion is higher than a melting point of the first separable portion.

7. An interrupter comprising:

a gas producer configured to produce a gas by burning a fuel;

an actuator pin configured to be driven under pressure of the gas produced by the gas producer;

an electrical conductor configured to electrically connect two terminals of an external electric circuit; and a mask having electrical insulation properties, the electrical conductor including:

a first terminal portion;

a second terminal portion; and a separable portion connected to the first terminal portion and the second terminal portion, the electrical conductor having:

a first groove located between the first terminal portion and the separable portion; and a second groove located between the second terminal portion and the separable portion, the separable portion being configured to be separated from the first terminal portion and the second terminal portion by the actuator pin, a first width of the separable portion being narrower than a second width of the first terminal portion and a third width of the second terminal portion, the mask covering the first groove and the second groove.

8. An interrupter comprising:

a gas producer configured to produce a gas by burning a fuel;

an actuator pin configured to be driven under pressure of the gas produced by the gas producer;

a first electrical conductor configured to electrically connect two terminals of an external electric circuit and located below the actuator pin; and a second electrical conductor configured to electrically connect the two terminals of the external electric circuit, the first electrical conductor including:

a first terminal portion;

a third terminal portion; and a first separable portion connected to the first terminal portion and the third terminal portion, the second electrical conductor including:

a second terminal portion electrically connected to the first terminal portion;

a fourth terminal portion electrically connected to the third terminal portion; and a second separable portion connected to the second terminal portion and the fourth terminal portion, the first electrical conductor and the second electrical conductor being separate electrical conductors, the actuator pin being movable downward, the first separable portion being configured to be separated from the first terminal portion and the third terminal portion by the actuator pin, the second separable portion being configured to be separated from the second terminal portion and the fourth terminal portion by the actuator pin, the second separable portion located below the first separable portion, and a thickness of the first separable portion being greater than a thickness of the second separable portion.

9. The interrupter of claim 8, wherein before the actuator pin is driven, the first separable portion and the second separable portion are arranged side by side and spaced apart from each other in the first direction in which the actuator pin advances.

10. The interrupter of claim 8, wherein an electrical resistance of the first separable portion as measured in a second direction perpendicular to a first direction in which the actuator pin advances is smaller than an electrical resistance of the second separable portion as measured in the second direction.

11. The interrupter of claim 8, wherein a melting point of the second separable portion is higher than a melting point of the first separable portion.

12. The interrupter of claim 1, wherein the first electrical conductor has a first hole, the second electrical conductor has a second hole, and the first hole overlaps the second hole.

13. The interrupter of claim 1, further comprising a rivet connecting the first electrical conductor and the second electrical conductor.

14. The interrupter of claim 7, wherein the electrical conductor has two grooves on a surface facing the actuator pin.

15. The interrupter of claim 8, wherein the first electrical conductor has a first hole, the second electrical conductor has a second hole, and the first hole overlaps the second hole.

16. The interrupter of claim 8, further comprising a rivet, wherein the first electrical conductor and the second electrical conductor are connected to each other by the rivet.

* * * * *